(12) United States Patent
Marjanovic et al.

(10) Patent No.: US 10,179,748 B2
(45) Date of Patent: *Jan. 15, 2019

(54) LASER PROCESSING OF SAPPHIRE SUBSTRATE AND RELATED APPLICATIONS

(71) Applicant: Corning Incorporated, Corning, NY (US)

(72) Inventors: Sasha Marjanovic, Painted Post, NY (US); Garrett Andrew Piech, Corning, NY (US); Sergio Tsuda, Horseheads, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,305

(22) Filed: May 3, 2017

(65) Prior Publication Data
US 2017/0291844 A1   Oct. 12, 2017

Related U.S. Application Data

(63) Continuation of application No. 14/529,976, filed on Oct. 31, 2014, now Pat. No. 9,676,167.
(Continued)

(51) Int. Cl.
*B32B 3/00* (2006.01)
*C03B 33/02* (2006.01)
(Continued)

(52) U.S. Cl.
CPC ...... *C03B 33/0222* (2013.01); *B23K 26/0006* (2013.01); *B23K 26/0613* (2013.01);
(Continued)

(58) Field of Classification Search
CPC .................................................. B23K 2203/50
See application file for complete search history.

(56) References Cited

U.S. PATENT DOCUMENTS

| 1,790,397 A | 1/1931 | Woods et al. |
| 2,682,134 A | 6/1954 | Stookey |
| (Continued) | | |

FOREIGN PATENT DOCUMENTS

| CN | 2388062 Y | 7/2000 |
| CN | 1283409 C | 11/2006 |
| (Continued) | | |

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.
(Continued)

*Primary Examiner* — Elizabeth E Mulvaney
(74) *Attorney, Agent, or Firm* — Kevin L. Bray

(57) ABSTRACT

A method of laser processing a material to form a separated part. The method includes focusing a pulsed laser beam into a laser beam focal line, viewed along the beam propagation direction, directed into the material, the laser beam focal line generating an induced absorption within the material, the induced absorption producing a hole or fault line along the laser beam focal line within the material, and directing a defocused carbon dioxide ($CO_2$) laser from a distal edge of the material over the plurality of holes to a proximal edge of the material.

29 Claims, 13 Drawing Sheets

Related U.S. Application Data

(60) Provisional application No. 62/022,890, filed on Jul. 10, 2014, provisional application No. 61/917,082, filed on Dec. 17, 2013.

(51) Int. Cl.
*B32B 17/06* (2006.01)
*B23K 26/53* (2014.01)
*B23K 26/55* (2014.01)
*B23K 26/06* (2014.01)
*B23K 26/073* (2006.01)
*B23K 26/00* (2014.01)
*B23K 26/0622* (2014.01)
*B23K 26/40* (2014.01)
*B23K 103/00* (2006.01)

(52) U.S. Cl.
CPC ...... *B23K 26/0624* (2015.10); *B23K 26/0738* (2013.01); *B23K 26/40* (2013.01); *B23K 26/53* (2015.10); *B23K 26/55* (2015.10); *B32B 17/06* (2013.01); *B23K 2103/50* (2018.08); *B32B 2250/02* (2013.01); *B32B 2315/02* (2013.01); *Y02P 40/57* (2015.11); *Y10T 428/21* (2015.01); *Y10T 428/24273* (2015.01); *Y10T 428/24355* (2015.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,657 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyarna |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,038,055 A | 3/2000 | Hansch et al. |
| 6,055,829 A | 5/2000 | Witzmann et al. |
| 6,078,599 A | 6/2000 | Everage |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,535,850 B1 | 10/2003 | Amako et al. |
| 6,635,849 B1 | 10/2003 | Okawa et al. |
| 6,720,519 B2 | 4/2004 | Liu et al. |
| 6,729,161 B1 | 5/2004 | Miura et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,566 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss et al. |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |

(56) References Cited

U.S. PATENT DOCUMENTS

| | | |
|---|---|---|
| 2003/0006221 A1 | 1/2003 | Hong et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimci et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Heckert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovalsek et al. |
| 2016/0008927 A1 | 1/2016 | Grundmueller et al. |
| 2016/0009066 A1 | 1/2016 | Niaber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0168396 A1 | 6/2016 | Letocart et al. |

(56) References Cited

U.S. PATENT DOCUMENTS

2016/0280580 A1 9/2016 Bohme
2016/0290791 A1 10/2016 Buono et al.

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| DE | 2231330 A1 | 10/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 | 11/1994 |
| JP | 9105243 A | 4/1997 |
| JP | 11197498 | 7/1999 |
| JP | 11269683 | 10/1999 |
| JP | 11330597 | 11/1999 |
| JP | 11347758 | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201226345 | 7/2012 |
| WO | 1999029243 | 6/1999 |
| WO | 1999063900 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016010954 A2 | 1/2016 |
| WO | 2016154284 A1 | 9/2016 |

OTHER PUBLICATIONS

Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

(56) References Cited

OTHER PUBLICATIONS

Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Desion Guidelines for Apple Devices, Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1—MIE 201-3; Corning Incorporated.
Corning 1737 AMLCD Glass Substrates Material Information; Aug. 2002; pp. MIE 101-1—MIE 101-3; Corning Incorporated.
Couairon, A. et al.; Femtosecond filamentation in transparent media; ScionceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-554; vol. 4, No. 4; Optical Society of America.
Eaton, S. et al.; Heat accumulation effects in femtosecond laser-written waveguides with variable repetition rate; Optics Express; Jun. 15, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K. et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov, A. et al.; Laser separation of chemically strengthened glass; ScienceDirect Physics Procedia; 2010, pp. 285-290; vol. 5; Elsevier B.V.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24588-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Re & RMS: Calculating Surface Roughness; Harrison Eelectropolishing; 2012.
Wu, W, et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.

(56) References Cited

OTHER PUBLICATIONS

Xu, H. et al.: Optimization of 3D laser cutting head orientation based on minimum energy consumption; Int J Adv Manuf Technol; Jun. 28, 2014; pp. 1283-1291; vol. 74; Springer-Verlag London.

Arimoto, R. et al.; Imaging properties of axicon in a scanning optical system; Applied Optics; Nov. 1, 1991; pp. 6653-6657; vol. 31, No. 31; Optical Society of America.

Betriebsanleitung; TruMicro 5000; Aug. 2011; pp. 1-4.

Bhuyan, M. et al.; High aspect ratio nanochannel machining using single shot femtosecond Bessel beams; Applied Physics Letters; Aug. 23, 2010; pp. 081102-1-081102-3; vol. 97.

Bhuyan, M. et al.; High aspect ratio taper-free microchannel fabrication using femtosecond Bessel beams; Optics Express; Jan. 18, 2010; pp. 566-574; vol. 18, No. 2; Optical Society of America.

Cubeddu, R. et al.; A compact time-resolved reflectance system for dual-wavelength multichannel assessment of tissue absorption and scattering; SPIE Conference on Optical Tomography and Spectroscopy of Tissue III; San Jose, California; Jan. 1999; pp. 450-455; vol. 3597; SPIE.

Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.

Ding, Z. et al.; High-resolution optical coherence tomography over a large depth range with an axicon lens; Optics Letters; Feb. 15, 2002; pp. 243-245; vol. 27, No. 4; Optical Society of America.

EagleEtch; The Anti-glare Glass for Technical Display Applications; Glass and Polymer Technologies; pp. 1-8; EuropTec USA Inc.

Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.

Glezer, E. et al.; Ultrafast-laser driven micro-explosions in transparent materials; Applied Physics Letters; 1997; pp. 882-884, vol. 71.

Golub. I.; Fresnel axicon; Optics Letters; Jun. 15, 2006; pp. 1890-1892;. vol. 31, No. 12; Optical Society of America.

Herman, P. et al.: Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.

Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.

Kruger, J. et al.; Femtosecond-pulse visible laser processing of transparent materials; Applied Surface Science; 1996; pp. 430-438; Elsevier B.V.

Kruger, J. et al.; Laser micromachining of barium aluminium borosilicate glass with pulse durations between 20 fs and 3 ps; Applied Surface Science; 1998; pp. 892-898; Elsevier B.V.

Kruger, J. et al.; Structuring of dielectric and metallic materials with ultrashort laser pulses between 20 fs and 3 ps; SPIE Proceedings; San Jose, California; Feb. 8, 1997; pp. 40-47 vol. 2991; SPIE.

Lapczyna, M. et al.; Ultra high repetition rate (133 MHz) laser ablation of aluminum with 1.2-ps pulses; Applied Physics A Materials Science & Processing; Dec. 28, 1999; pp. S883-S886; vol. 69 (Suppl).; Springer-Verlag Physics.

Perry, M. et al.; Ultrashort-Pulse Laser Machining; Lawrence Livermore National Laboratory; Sep. 1998 ; pp. i-30.

Perry, M. et al.; Ultrashort-Pulse Laser Machining; International Congress on Applications of Lasers and Electro-Optics; Orlando, Florida; Nov. 16-19, 1998; pp. 1-24.

Perry, M. et al.; Ultrashort-pulse laser machining of dielectric materials; Journal of Applied Physics; May 1, 1999; pp. 6803-6810; vol. 85, No. 9; American Institute of Physics.

Pharos High-power Femtosecond Laser System specification; Light Conversion; 2011; pp. 1-2.

Polynkin, P. et al.; Extended filamentation with temporally chirped femtosecond Bessel-Gauss beams in air; Optics Express; Jan. 19, 2009; pp. 575-584; vol. 17, No. 2; Optical Society of America.

Serafetinides, A. et al.; Ultra-short pulsed laser ablation of polymers; Applied Surface Science; 2011; pp. 42-56; vol. 180; Elsevier Science B.V.

Sundaram, S. et al.; Inducing and probing non-thermal transitions in semiconductors using femtosecond laser pulses; Nature Materials; Dec. 2002; pp. 217-224; vol. 1; Nature Publishing Group.

Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.

Varel, H. et al.; Micromachining of quartz with ultrashort laser pulses; Applied Physics A Materials Science & Processing; 1997; pp. 367-373; vol. 65.

Yoshino, F. et al.; Micromachining with a High Repetition Rate Ferntosecond Fiber Laser; JLMN-Journal of Laser Micro/Nanoengineering; 2008; pp. 157-152; vol. 3, No. 3.

Zeng, D. et al.; Characteristic analysis of refractive axicon system for optical trepanning; Optical Engineering; Sep. 2006; pp. 094302-1-094302-10; vol. 45, No. 9.

Zhang, G. et al.; Design of diffractive-phase axicon illuminated by a Gaussian-profile beam; Acta Physica Sinica; May 1996; pp. 354-364; vol. 5, No. 5; Chin. Phys. Soc.

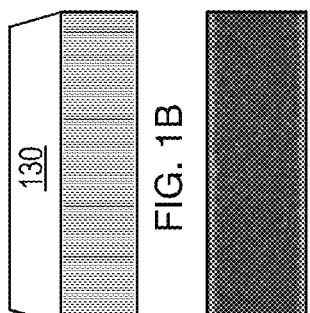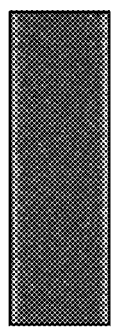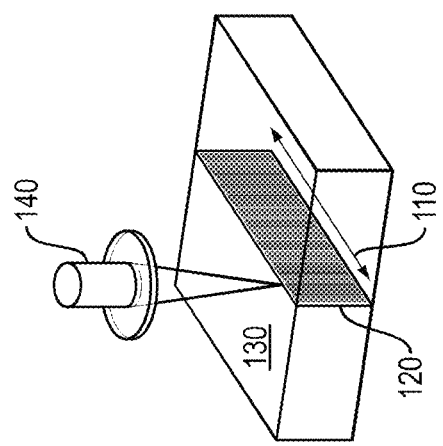
FIG. 1B
FIG. 1C
FIG. 1A

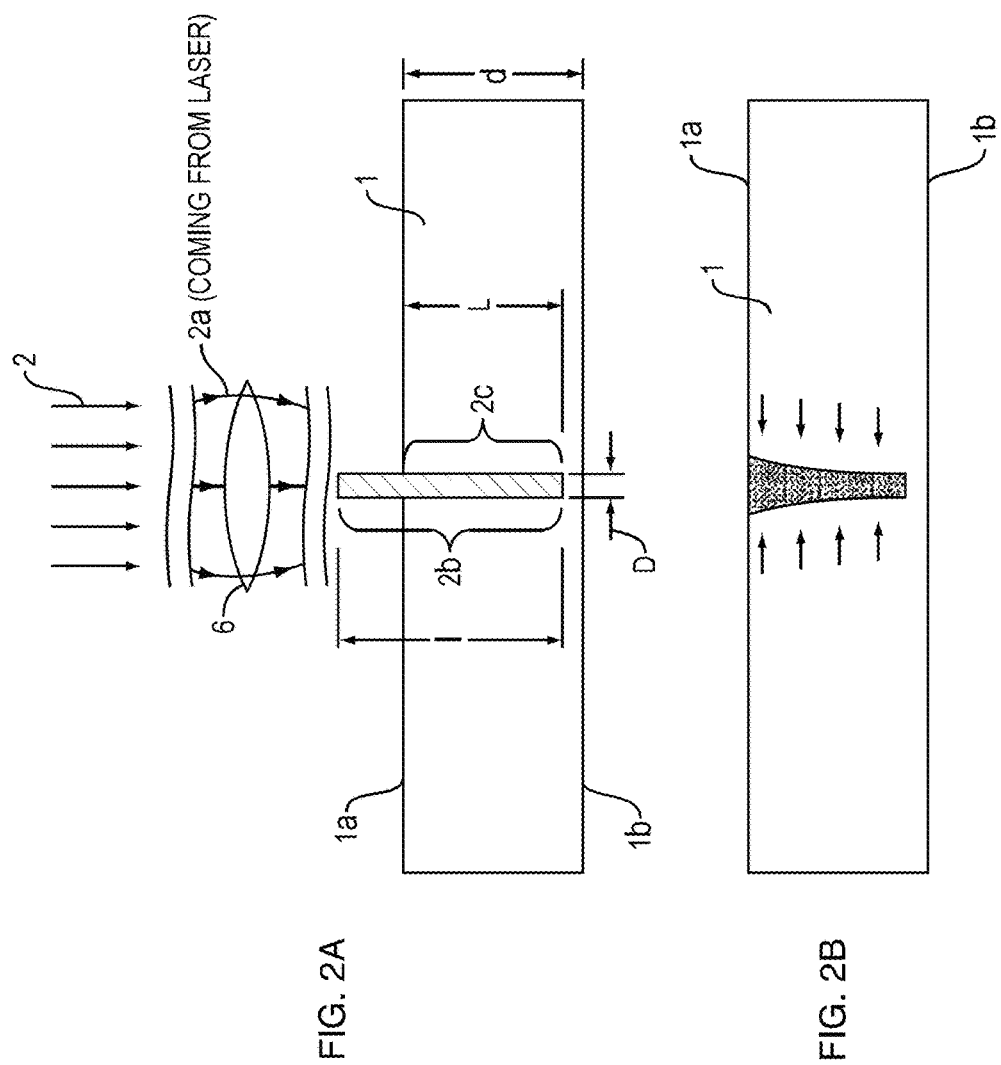

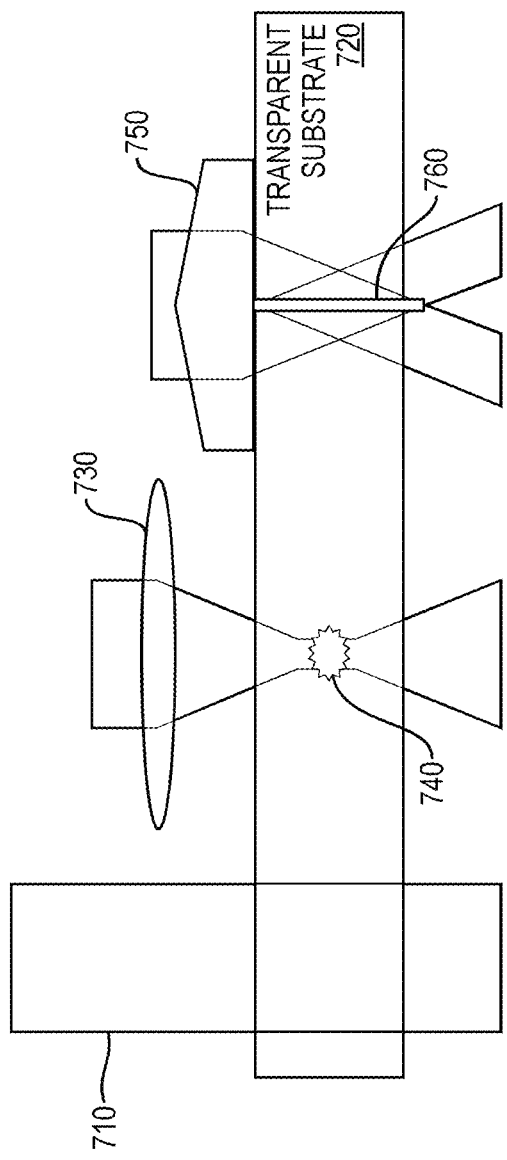

LASER PROCESSING OF SAPPHIRE SUBSTRATE AND RELATED APPLICATIONS

RELATED APPLICATIONS

This application is a continuation of U.S. patent application Ser. No. 14/529,976, filed on Oct. 31, 2014, which claims the benefit of U.S. Provisional Application No. 61/917,082 filed on Dec. 17, 2013, and the benefit of U.S. Provisional Application No. 62/022,890 filed on Jul. 10, 2014; the entire disclosures of which are incorporated herein by reference.

BACKGROUND

The area of laser processing of materials encompasses a wide variety of applications that involve cutting, drilling, milling, welding, melting, etc. and different types of materials. Among these applications, one that is of particular interest is cutting or separating parts from different types of substrate materials, such as separating arbitrary shapes out of sapphire. Sapphire possesses exceptional hardness and toughness, properties that make it very resistant to scratching, and it is also highly transparent to wavelengths of light between 150 nm and 5500 nm.

Sapphire is used in several applications that rely on its unique and exceptional combination of electrical, mechanical, thermal, and optical properties. These applications include infrared optical components, such as in scientific instruments, high-durability windows, barcode scanners, wristwatch crystals and movement bearings, and very thin electronic wafers, which are used as the insulating substrates of special-purpose solid-state electronics (most of which are integrated circuits). Sapphire is also used in the semiconductor industry as a non-conducting substrate for the growth of devices based on gallium nitride (GaN). In particular, sapphire has low electrical conductivity, but a relatively high thermal conductivity. Thus, sapphire provides good electrical insulation, while at the same time helping to conduct away the significant heat that is generated in all operating integrated circuits. More recently, it has been offered as an alternative material for smartphone camera windows, screen cover and touch applications in consumer electronics products.

Because sapphire is very hard, one of the major challenges in manufacturing parts out of this substrate material is the cutting process. Typically, cutting can be achieved by first using a diamond-tipped blade to scribe a pattern in the substrate. After that, the scribed profile is either subjected to a mechanical force that propagates the crack into the substrate and along the traced profile to separate the part completely, or scribing is followed by a second pass of the circular diamond blade to cut through the substrate. The diamond blade has a small but finite width and the separation process reserves a "street" (typically greater than about 40 μm) between two parts to be separated to account for the width of the diamond blade. To maintain the quality of the edge of the part separated from the substrate and also to avoid catastrophic and uncontrolled cracking of the substrate, the diamond tip blade must be operated at a low speed, which prolongs the separation process. Also, because of the abrasion, the diamond tips on the blade wear out and must be replaced often—as much as one blade per wafer, which slows down the manufacturing process and increases costs. Finally, the mechanical scribing process causes cracks, which can damage the substrate and reduce yields (typical yields are claimed to be about 70%).

Another challenge regarding sapphire cutting and processing is related to shapes of separated parts. Due to the crystalline nature of sapphire, cleavage and separation preferentially occur in straight lines aligned with one of the crystal planes. However, this same feature makes it difficult to cut and separate sapphire parts having more complex shapes. For example, when separating a circular shape out of a square substrate, depending on the induced stress and the crystal alignment to the circular shape, crack propagation can deviate from the intended circular path and instead occur along a path of least resistance following one of the structural crystal planes.

From process development and cost perspectives, there are many opportunities for improvement in cutting and separation of sapphire substrates. It is of great interest to have a faster, cleaner, cheaper, more repeatable and more reliable method of sapphire separation than what is currently practiced in the market today. Among several alternative technologies, laser separation has been tried and demonstrated using different approaches. The techniques range from: 1) actual removal of material between the boundaries of the desired part (or parts) and its surrounding substrate matrix; 2) creation of defects within the bulk of the material to weaken or seed it with cracking initiation points along the perimeter of the desired shape profile followed by a secondary breaking step; and 3) propagation of an initial crack by thermal stress separation. These laser cutting processes have demonstrated the potential economic and technical advantages, such as precision, good edge finish, and low residual stress compared to competing technologies (mechanical scribing and breaking, high pressure water jet and ultrasonic milling, etc).

There is nevertheless a continuing need for an improved process for cutting and separating arbitrary shapes of sapphire.

SUMMARY

The embodiments disclosed herein relate to a laser process for cutting and separating arbitrary shapes from sapphire and other substrate materials. The developed laser method can be tailored for manual separation of the parts from the substrate or full laser separation by thermally stressing the desired profile. The method involves the utilization of an ultra-short pulse laser to establish a fault line in the substrate consistent with the shape of the part that one desires to separate from the substrate. The fault line defines a path of preferred crack propagation that facilitates separation of a part having a desired shape while avoiding errant crack propagation and damage in other directions. The ultra-short laser pulse(s) may be optionally followed by a $CO_2$ laser or other source of thermal stress to effect fully automated separation of the part from the substrate.

In one embodiment, a method of laser cutting a material to form a separated part includes focusing a pulsed laser beam into a laser beam focal line, directing the laser beam focal line into the material, the laser beam focal line generating an induced absorption within the material, the induced absorption producing a hole or defect line along the laser beam focal line within the material, translating the material or the laser beam relative to one another, thereby forming a plurality of defect lines in the material with the laser, and directing a IR laser beam over the plurality of holes or defect lines. The laser beam focal line can be oriented along a beam propagation direction. The material can be sapphire.

A pulse duration of the pulsed laser beam can be in a range of between greater than about 1 picosecond and less than about 100 picoseconds, or in a range of between greater than about 5 picoseconds and less than about 20 picoseconds. A repetition rate of the pulsed laser beam can be in a range of between 1 kHz and 2 MHz, or a range of between 10 kHz and 650 kHz. The pulsed laser beam can have an average laser power measured, at the material, greater than 40 µJ per mm thickness of material. The pulses can be produced in bursts of at least two pulses. Pulses within the burst can be separated by a duration in a range of between 1 nsec and 50 nsec, or in a range of between 10 nsec and 30 nsec, or in a range between 15 nsec and 25 nsec. Multiple bursts can be applied to the material, where each burst includes two or more pulses and the burst repetition frequency is in a range of between about 1 kHz and about 2000 kHz.

The pulsed laser beam can have a wavelength selected such that the material is substantially transparent at this wavelength. The laser beam focal line can have a length in a range of between about 0.1 mm and about 100 mm, or in a range of between about 0.1 mm and about 10 mm. The laser beam focal line can have an average spot diameter in a range of between about 0.1 µm and about 5 µm.

The method can further include directing the IR laser from a proximal edge of the material to a tangential edge of the part, or from a distal edge of the material to a tangential edge of the part, to separate the part from the material. Directing the IR laser beam can also include directing a $CO_2$ laser beam. The IR laser beam can be defocused to a spot size in a range of between about 2 mm and about 20 mm. The IR laser beam can be directed from a distal edge of the material to a proximal edge of the material.

An article includes an edge having a series of defect lines, where each defect line extends at least 250 µm, the defect lines are less than 5 µm in diameter, the edge has a surface roughness Ra<0.5 µm, and a subsurface damage of a glass edge is <100 µm. The subsurface damage of the glass edge can also be <75 µm. The defect lines can extend through the full thickness of the article. A distance between the defect lines can be greater than 0.5 µm and less than or equal to about 15 µm, and the article can be less than 1.5 mm thick. The article can include sapphire. The article can also be a circular disk or comprise a glass substrate with a sapphire layer attached thereto. The glass substrate can be from 100 microns to 1 mm thick, and the sapphire layer can be from 1 micron to 600 microns thick.

In yet another embodiment, a method of laser cutting a material includes: (i) focusing a pulsed laser beam into a laser beam focal line; (ii) directing the laser beam focal line into the material, the laser beam focal line generating an induced absorption within the material, the induced absorption producing a defect line along the laser beam focal line within the material; (iii) repeatedly performing (i) and (ii) to form a fault line within the material, the fault line including a plurality of the defect lines; and (iv) directing an IR laser beam over the fault line. The fault line can be linear, curved or circular. Directing the IR laser beam can fracture the material along the fault line.

These embodiments have many advantages including full separation of parts being cut with reduced laser power, reduced subsurface defects, increased process cleanliness, creation of complex profiles and shapes in different sizes, and elimination of process steps.

The present disclosure extends to:
A method of laser cutting a material comprising:
  focusing a pulsed laser beam into a laser beam focal line;
  directing the laser beam focal line into the material, the laser beam focal line generating an induced absorption within the material, the induced absorption producing a defect line along the laser beam focal line within the material;
  translating the material or the laser beam relative to one another, thereby forming a plurality of defect lines in the material with the laser; and
  directing an IR laser beam over the plurality of defect lines.

The present disclosure extends to:
An article comprising sapphire, the article including an edge having a series of defect lines where each defect line extends at least 250 µm, the defect lines are less than 5 µm in diameter, the edge has a surface roughness Ra<0.5 µm, and the subsurface damage of the edge is <100 µm.

The present disclosure extends to:
A method of laser cutting a material comprising:
  (i) focusing a pulsed laser beam into a laser beam focal line;
  ii) directing the laser beam focal line into the material, the laser beam focal line generating an induced absorption within the material, the induced absorption producing a defect line along the laser beam focal line within the material;
  (iii) repeatedly performing (i) and (ii) to form a fault line within the material, the fault line including a plurality of the defect lines; and
  (iv) directing an IR laser beam over the fault line.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1A-1C are: FIG. 1A: an illustration of a laser creating a fault line through the sample; FIG. 1B: an illustration of an edge with defect line after separation; FIG. 1C: a photograph of a separated edge.

FIGS. 2A and 2B are illustrations of positioning of the laser beam focal line, i.e., the processing of a material transparent for the laser wavelength due to the induced absorption along the focal line.

FIG. 4 is an illustration of a second optical assembly for laser drilling.

FIGS. 7A-7C are illustrations of different regimes for laser processing of materials. FIG. 7A: unfocused laser beam; FIG. 7B: condensed laser beam with spherical lens; FIG. 7C: condensed laser beam with axicon or diffractive Fresnel lens.

DETAILED DESCRIPTION

Figure 3A:
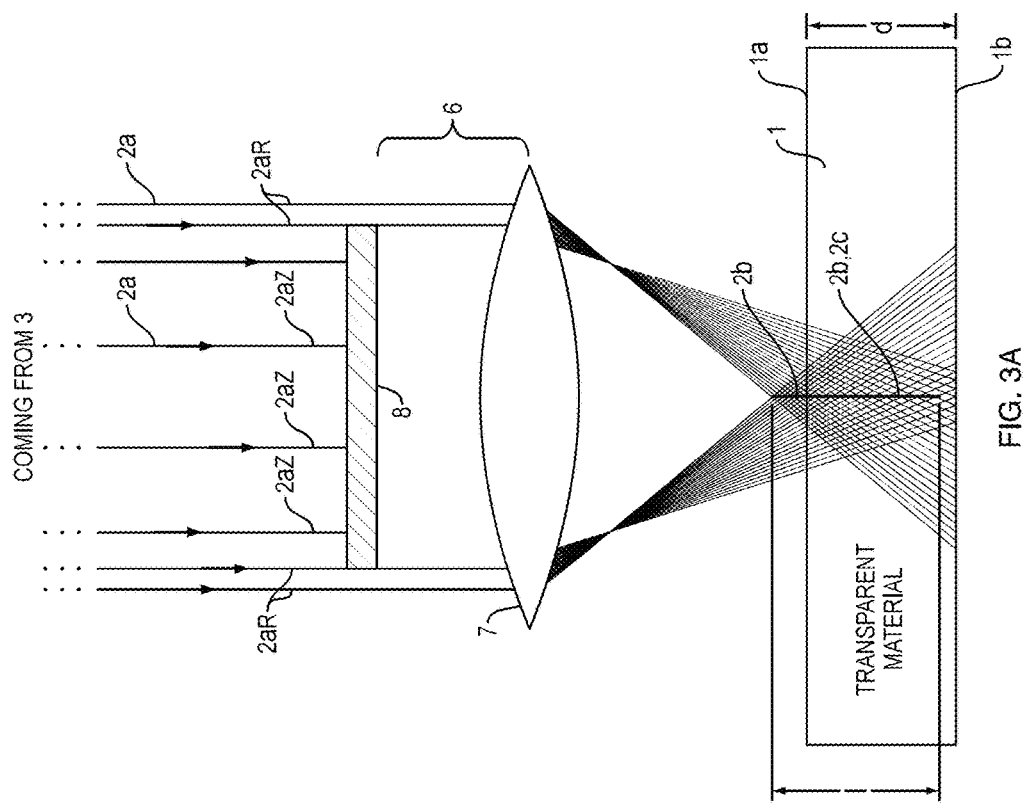
FIG. 3A is an illustration of an optical assembly for laser drilling.

A description of example embodiments follows.

The disclosed embodiments provide a laser process for precision cutting and separation of arbitrary shapes out of substrates that contain sapphire. The sapphire-containing substrate may be pure sapphire, a composite of sapphire with one or more other materials, a sapphire blend, a sapphire-coated material and material having sapphire integrated therewith. In one embodiment, the sapphire-containing substrate is glass with a sapphire layer attached, bonded, laminated, or coated thereon. References to sapphire, sapphire substrates and the like herein are contemplated to extend to sapphire-containing substrates generally. The process separates parts in a controllable fashion with negligible debris, minimum defects and low subsurface damage to the edges to preserve part strength. The laser cutting method is well suited for materials that are transparent to the selected laser wavelength. The materials should preferably be substantially transparent to the selected laser wavelength (i.e., absorption less than about 10%, and preferably less than about 1% per µm of material depth). Demonstrations of the method have been made using 0.55 mm thick sheets of C-axis cut sapphire polished on both sides.

The process fundamental step is to use an ultra-short laser pulse to create a fault line that delineates the desired shape of the separated part. The fault line establishes a path of least resistance for crack propagation and hence for separation and detachment of the shape from its substrate matrix. The laser separation method can be tuned and configured to enable manual separation, partial separation or total separation of sapphire shapes out of the original substrate.

According to laser methods described below, in a single pass, a laser can be used to create highly controlled full line perforations through a substrate or material, with extremely little (<75 µm, often <50 µm) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (>100 µm) and edge chipping occur.

As used herein, subsurface damage refers to the maximum size (e.g. length, width, diameter) of structural imperfections in the perimeter surface of the part separated from the substrate or material subjected to laser processing in accordance with the present disclosure. Since the structural imperfections extend from the perimeter surface, subsurface damage may also be regarded as the maximum depth from the perimeter surface in which damage from laser processing in accordance with the present disclosure occurs. The perimeter surface of the separated part may be referred to herein as the edge or edge surface of the separated part. The structural imperfections may be cracks or voids and represent points of mechanical weakness that promote fracture or failure of the part separated from the substrate or material. By minimizing the size of subsurface damage, the present method improves the structural integrity and mechanical strength of separated parts. Sub-surface damage may be limited to the order of 100 µm in depth or less, or 75 µm in depth or less, or 60 µm in depth or less, or 50 µm in depth or less, and the cuts may produce only low debris.

Thus, it is possible to create microscopic (i.e., <0.5 µm and >100 nm in diameter) elongated defect lines (also referred to herein as perforations or damage tracks) in transparent material using one or more high energy pulses or one or more bursts of high energy pulses. The perforations represent regions of the substrate material modified by the laser. The laser-induced modifications disrupt the structure of the substrate material and constitute sites of mechanical weakness. Structural disruptions include compaction, melting, dislodging of material, rearrangements, and bond scission. The perforations extend into the interior of the substrate material and have a cross-sectional shape consistent with the cross-sectional shape of the laser (generally circular). The average diameter of the perforations may be in the range from 0.1 µm to 50 µm, or in the range from 1 µm to 20 µm, or in the range from 2 µm to 10 µm, or in the range from 0.1 µm to 5 µm. In some embodiments, the perforation is a "through hole", which is a hole or an open channel that extends from the top to the bottom of the substrate material. In some embodiments, the perforation may not be a continuously open channel and may include sections of solid material dislodged from the substrate material by the laser. The dislodged material blocks or partially blocks the space defined by the perforation. One or more open channels (unblocked regions) may be dispersed between sections of dislodged material. The diameter of the open channels is may be <1000 nm, or <500 nm, or <400 nm, or <300 nm or in the range from 10 nm to 750 nm, or in the range from 100 nm to 500 nm. The disrupted or modified area (e.g., compacted, melted, or otherwise changed) of the material surrounding the holes in the embodiments disclosed herein, preferably has diameter of <50 µm (e.g, <10 µm).

The individual perforations can be created at rates of several hundred kilohertz (several hundred thousand perforations per second, for example). Thus, with relative motion between the laser source and the material the perforations can be placed adjacent to one another (spatial separation varying from sub-micron to several microns as desired). This spatial separation is selected in order to facilitate cutting.

In the first step, the sapphire substrate, or a glass substrate with a sapphire layer thereon, is irradiated with an ultra-short pulsed laser beam that is condensed into a high aspect ratio line focus that penetrates through the thickness of the substrate or through the thickness of the glass and the sapphire layer situated thereon. Where a glass substrate has a sapphire layer attached thereon, the glass substrate can be 100 µm to 1 mm thick, for example, and the sapphire thickness range from thin coatings to thicker 600 µm layers, and a sapphire layer thickness greater than 600 µm can be expected to become excessively brittle. Within this volume of high energy density produced by using the ultra-short pulsed laser beam, the material is modified via nonlinear effects. The nonlinear effects provide a mechanism of transferring energy from the laser beam to the substrate to enable formation of a vertical defect line. It is important to note that without this high optical intensity nonlinear absorption is not triggered. Below the intensity threshold for nonlinear effects, the material is transparent to the laser radiation and remains in its original state. By scanning the laser over a desired line or path, a narrow fault line (a few microns wide, formed of a plurality of vertical defect lines) is created that defines the perimeter or shape of the part to be separated from the substrate.

Nonlinear effects induced by the high intensity laser beam include multi-photon absorption (MPA) in the transparent material. MPA is the simultaneous absorption of multiple (two or more) photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is generally several orders of magnitude weaker than linear absorption. It differs from linear absorption in that the strength of MPA depends on the square or higher power of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example. Thus, atoms and bonds can be selectively excited or ionized in the regions of a material where the energy density of the laser beam is sufficiently high to induce nonlinear TPA of a laser wavelength having half the required excitation energy, for example.

MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line, damage line, or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

Once the fault line with vertical defects is created, separation can occur via: 1) manual or mechanical stress on or around the fault line; the stress or pressure should create tension that pulls both sides of the fault line apart and breaks the areas that are still bonded together; 2) using a heat source to create a stress zone around the fault line to put the vertical defect lines in tension and inducing partial or total self-separation. In both cases, separation depends on process parameters such as laser scan speed, laser power, parameters of lenses, pulse width, repetition rate, etc.

The present application provides a laser method and apparatus for precision cutting and separation of arbitrary shapes out of sapphire or other substrates in a controllable fashion, with negligible debris and minimum damage to the edges of the separated part. Damage to the edges of the separated part is a common feature of prior art cutting processes and leads to a weakening of the separated part. The present method avoids edge damage to preserve the strength of the separated part.

The developed laser method relies on the transparency of the substrate material to the laser wavelength in the linear regime of power (low laser intensity). Transparency reduces or prevents damage to the surface of the substrate as well as subsurface damage away from the region of high intensity defined by the focused laser beam. One feature of this process is the high aspect ratio of the defect line (also referred to herein as a perforation or damage track) created by the ultra-short pulsed laser. It allows creation of a defect line that extends from the top surface to the bottom surface of the substrate material. The defect line can be created by a single pulse or single burst of pulses and if desired, additional pulses or bursts can be used to increase the extension of the affected area (e.g. depth and width).

As illustrated in FIGS. 1A-1C, the method to cut and separate sapphire is essentially based on creating a fault line 110 formed of a plurality of vertical defect lines 120 in the substrate material 130 with an ultra-short pulsed laser 140. Depending on the material properties (absorption, CTE, stress, composition, etc.) and laser parameters chosen for processing the material 130, the creation of a fault line 110 alone can be enough to induce self-separation. In this case, no secondary separation processes, such as tension/bending forces, heating, or $CO_2$ laser, are necessary.

In some cases, the created fault line is not enough to separate the part spontaneously and a secondary step may be necessary. If so desired, a second laser can be used to create thermal stress to separate it, for example. In the case of sapphire, separation can be achieved, after the creation of a fault line, by application of mechanical force or by using a thermal source (e.g. an infrared laser, for example a $CO_2$ laser) to create thermal stress and force the part to separate from the substrate. Another option is to have the $CO_2$ laser only start the separation and then finish the separation manually. The optional $CO_2$ laser separation is achieved, for example, with a defocused cw laser emitting at 10.6 μm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, defocused spot sizes of about 7 mm, 2 mm and 20 mm can be used for $CO_2$ lasers, for example, whose diffraction-limited spot size is much smaller given the emission wavelength of 10.6 μm.

Distance between adjacent defect lines 120 along the direction of the fault lines 110 can, for example, be in range from 0.25 µm to 50 µm, or in the range from 0.50 µm to about 20 µm, or in the range from 0.50 µm to about 15 µm, or in the range from 0.50 µm to 10 µm, or in the range from 0.50 µm to 3.0 µm or in the range from 3.0 µm to 10 µm.

There are several methods to create the defect line. The optical method of forming the line focus can take multiple forms, using donut-shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached in the region of focus to create breakdown of the substrate material (e.g. sapphire or glass with a sapphire layer thereon) through nonlinear optical effects. A sapphire layer can be bonded onto a glass substrate, for example. Glass substrates can include high-performance glass such as Corning's Eagle X6®, or inexpensive glass such as soda-lime glass, for example.

In the present application, an ultra-short pulsed laser is used to create a high aspect ratio vertical defect line in a consistent, controllable and repeatable manner. The details of the optical setup that enables the creation of this vertical defect line are described below, and in U.S. Application No. 61/752,489 filed on Jan. 15, 2013, the entire contents of which are incorporated by reference as if fully set forth herein. The essence of this concept is to use an axicon lens element in an optical lens assembly to create a region of high aspect ratio, taper-free microchannels using ultra-short (picoseconds or femtosecond duration) Bessel beams. In other words, the axicon condenses the laser beam into a high intensity region of cylindrical shape and high aspect ratio (long length and small diameter) in the substrate material. Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the material where the laser energy intensity is not high (e.g., substrate surface, volume of substrate surrounding the central convergence line), the material is transparent to the laser and there is no mechanism for transferring energy from the laser to the material. As a result, nothing happens to the substrate when the laser intensity is below the nonlinear threshold.

Turning to FIGS. 2A and 2B, a method of laser drilling a material includes focusing a pulsed laser beam 2 into a laser beam focal line 2b, viewed along the beam propagation direction. Laser beam focal line 2b can be created by several ways, for example, Bessel beams, Airy beams, Weber beams and Mathieu beams (i.e, non-diffractive beams), whose field profiles are typically given by special functions that decay more slowly in the transverse direction (i.e. direction of propagation) than the Gaussian function. As shown in FIG. 3A, laser 3 (not shown) emits laser beam 2, which has a portion 2a incident to optical assembly 6. The optical assembly 6 turns the incident laser beam into a laser beam focal line 2b on the output side over a defined expansion range along the beam direction (length l of the focal line). The planar substrate 1 is positioned in the beam path to at least partially overlap the laser beam focal line 2b of laser beam 2. Reference 1a designates the surface of the planar substrate facing the optical assembly 6 or the laser, respectively, and reference 1b designates the reverse surface of substrate 1. The substrate or material thickness (in this embodiment measured perpendicularly to the planes 1a and 1b, i.e., to the substrate plane) is labeled with d.

As FIG. 2A depicts, substrate 1 (or the glass layered with the sapphire substrate material thereon) is aligned substantially perpendicular to the longitudinal beam axis and thus behind the same focal line 2b produced by the optical assembly 6 (the substrate is perpendicular to the plane of the drawing). Viewed along the beam direction, the substrate is positioned relative to the focal line 2b in such a way that the focal line 2b starts before the surface 1a of the substrate and stops before the surface 1b of the substrate, i.e. still focal line 2b terminates within the substrate and does not extend beyond surface 1b. In the overlapping area of the laser beam focal line 2b with substrate 1, i.e. in the substrate material covered by focal line 2b, the laser beam focal line 2b generates (assuming suitable laser intensity along the laser beam focal line 2b, which intensity is ensured by the focusing of laser beam 2 on a section of length l, i.e. a line focus of length l) a section 2c (aligned along the longitudinal beam direction) along which an induced absorption is generated in the substrate material. The induced absorption induces defect line formation in the substrate material along section 2c. The formation of the defect line is not only local, but extends over the entire length of section 2c of the induced absorption. The length of section 2c (which corresponds to the length of the overlapping of laser beam focal line 2b with substrate 1) is labeled with reference L. The average diameter or extent of the section of the induced absorption 2c (or the sections in the material of substrate 1 undergoing the formation of defect lines) is labeled with reference D. This average extent D basically corresponds to the average diameter δ of the laser beam focal line 2b, that is, an average spot diameter in a range of between about 0.1 µm and about 5 µm.

As FIG. 2A shows, the substrate material (which is transparent to the wavelength λ of laser beam 2) is heated due to the induced absorption along the focal line 2b arising from the nonlinear effects (e.g. two-photon absorption, multi-photon absorption) associated with the high intensity of the laser beam within focal line 2b. FIG. 2B illustrates that the heated substrate material will eventually expand so that a corresponding induced tension leads to micro-crack formation, with the tension being the highest at surface 1a.

Representative optical assemblies 6, which can be applied to generate the focal line 2b, as well as a representative optic setup, in which these optical assemblies can be applied, are described below. All assemblies or setups are based on the description above so that identical references are used for identical components or features or those which are equal in their function. Therefore only the differences are described below.

To ensure high quality (regarding breaking strength, geometric precision, roughness and avoidance of re-machining requirements) of the surface of the separated part along which separation occurs, the individual focal lines positioned on the substrate surface along the line of separation should be generated using the optical assembly described below (hereinafter, the optical assembly is alternatively also referred to as laser optics). The roughness of the separated surface (the perimeter surface of the separated part) is determined primarily by the spot size or the spot diameter of the focal line. Roughness of a surface can be characterized, for example, by the Ra surface roughness parameter defined by the ASME B46.1 standard. As described in ASME B46.1, Ra is the arithmetic average of the absolute values of the surface profile height deviations from the mean line, recorded within the evaluation length. In alternative terms, Ra is the average of a set of absolute height deviations of individual features (peaks and valleys) of the surface relative to the mean.

In order to achieve a small spot size of, for example, 0.5 µm to 2 µm in case of a given wavelength λ of laser 3 (interaction with the material of substrate 1), certain requirements must usually be imposed on the numerical aperture of laser optics 6. These requirements are met by laser optics 6 described below. In order to achieve the required numerical aperture, the optics must, on the one hand, dispose of the required opening for a given focal length, according to the known Abbe formulae (N.A.=n sin (theta), n: refractive index of the material to be processed, theta: half the aperture angle; and theta=arctan ($D_L$/2f); $D_L$: aperture diameter, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening, and thus the percentage of the numerical aperture, only vary slightly.

According to FIG. 3A (section perpendicular to the substrate plane at the level of the central beam in the laser beam bundle of laser radiation 2; here, too, laser beam 2 is perpendicularly incident to the substrate plane (before entering optical assembly 6), i.e. incidence angle θ is 0° so that the focal line 2b or the section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to $1/e^2$ of the peak intensity) and approximately 75% of the diameter of the lens 7 of the optical assembly 6. The focal line 2b of a non-aberration-corrected spherical lens 7 generated by blocking out the beam bundles in the center is thus used. FIG. 3A shows the section in one plane through the central beam, and the complete three-dimensional bundle can be seen when the depicted beams are rotated around the focal line 2b.

One potential disadvantage of this type of a focal line formed by lens 7 and the system shown in FIG. 3A is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the substrate material in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 3B:
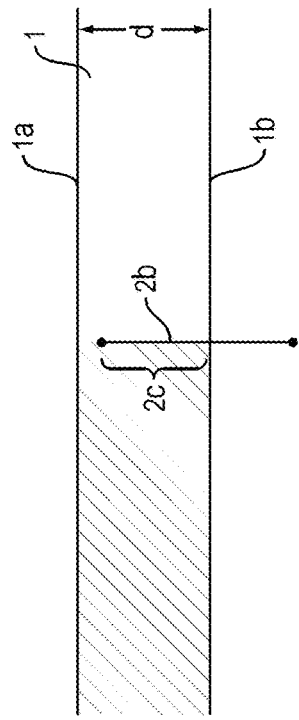
FIGS. 3B-1-3B-4 are an illustration of various possibilities to process the substrate by differently positioning the laser beam focal line relative to the substrate.
Figures 2, 3B:
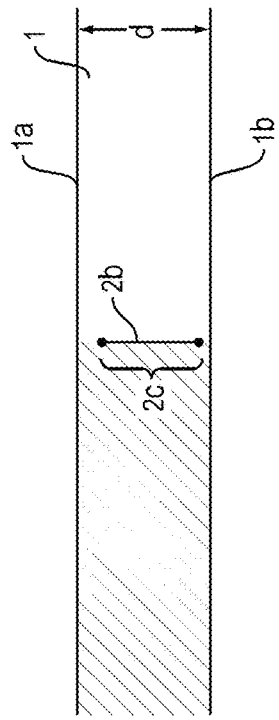
Figures 3, 3B:
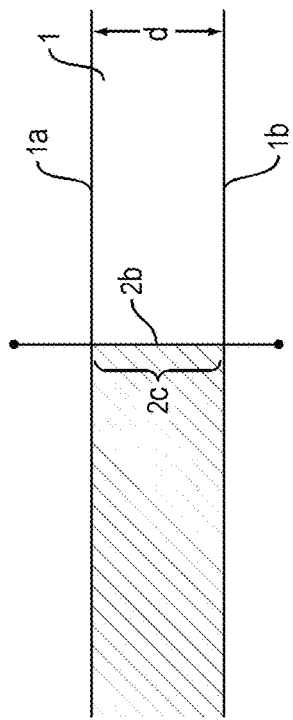
Figures 3, 3B, 4:
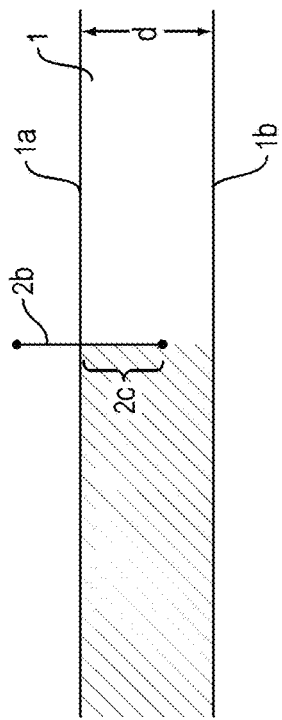
Figure 4:
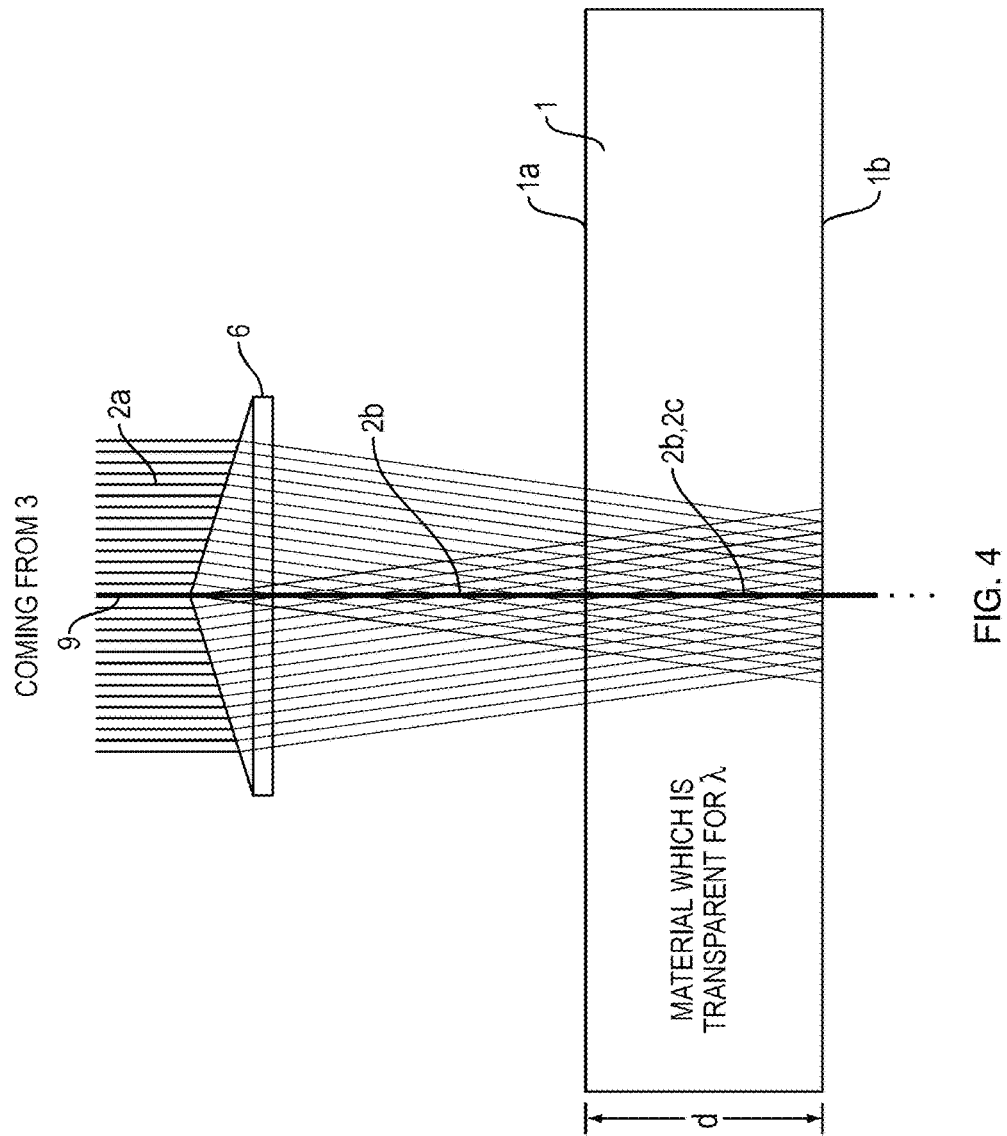

FIG. 3B-1-4 show (not only for the optical assembly in FIG. 3A, but also for any other applicable optical assembly 6) that the position of laser beam focal line 2b can be controlled by suitably positioning and/or aligning the optical assembly 6 relative to substrate 1 as well as by suitably selecting the parameters of the optical assembly 6. As FIG. 3B-1 illustrates, the length l of the focal line 2b can be adjusted in such a way that it exceeds the substrate thickness d (here by factor 2). If substrate 1 is placed (viewed in longitudinal beam direction) centrally to focal line 2b, the section of induced absorption 2c is generated over the entire substrate thickness. The laser beam focal line 2b can have a length l in a range of between about 0.1 mm and about 100 mm or in a range of between about 0.1 mm and about 10 mm, or in a range of between about 0.1 mm and about 1 mm, for example. Various embodiments can be configured to have length l of about 0.1 mm, 0.2 mm, 0.3 mm, 0.4 mm, 0.5 mm, 0.7 mm, 1 mm, 2 mm, 3 mm or 5 mm, for example.

In the case shown in FIG. 3B-2, a focal line 2b of length l is generated which corresponds more or less to the substrate thickness d. Since substrate 1 is positioned relative to line 2b in such a way that line 2b starts at a point outside the substrate, the length L of the section of induced absorption 2c (which extends here from the substrate surface to a defined substrate depth, but not to the reverse surface 1b) is smaller than the length l of focal line 2b. FIG. 3B-3 shows the case in which the substrate 1 (viewed along the beam direction) is positioned above the starting point of focal line 2b so that, as in FIG. 3B-2, the length l of line 2b is greater than the length L of the section of induced absorption 2c in substrate 1. The focal line thus starts within the substrate and extends beyond the reverse (remote) surface 1b. FIG. 3B-4 shows the case in which the focal line length l is smaller than the substrate thickness d so that—in the case of a central positioning of the substrate relative to the focal line viewed in the direction of incidence—the focal line starts near the surface 1a within the substrate and ends near the surface 1b within the substrate (e.g. l=0.75·d).

It is particularly advantageous to position the focal line 2b in such a way that at least one of surfaces 1a, 1b is covered by the focal line, so that the section of induced absorption 2c starts at least on one surface of the substrate. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one skilled in the art; the cone angle in the example is 10°. The apex of the axicon labeled here with reference 9 is directed towards the incidence direction and centered on the beam center. Since the focal line 2b produced by the axicon 9 starts within its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins within axicon 9, a significant part of the laser energy is not focused into the section of induced absorption 2c of focal line 2b, which is located within the material, in the situation where there is a separation between axicon 9 and the substrate material. Furthermore, length l of focal line 2b is related to the beam diameter through the refractive indices and cone angles of axicon 9. This is why, in the case of relatively thin materials (several millimeters), the total focal line is much longer than the substrate thickness, having the effect that much of the laser energy is not focused into the material.

Figure 5A:
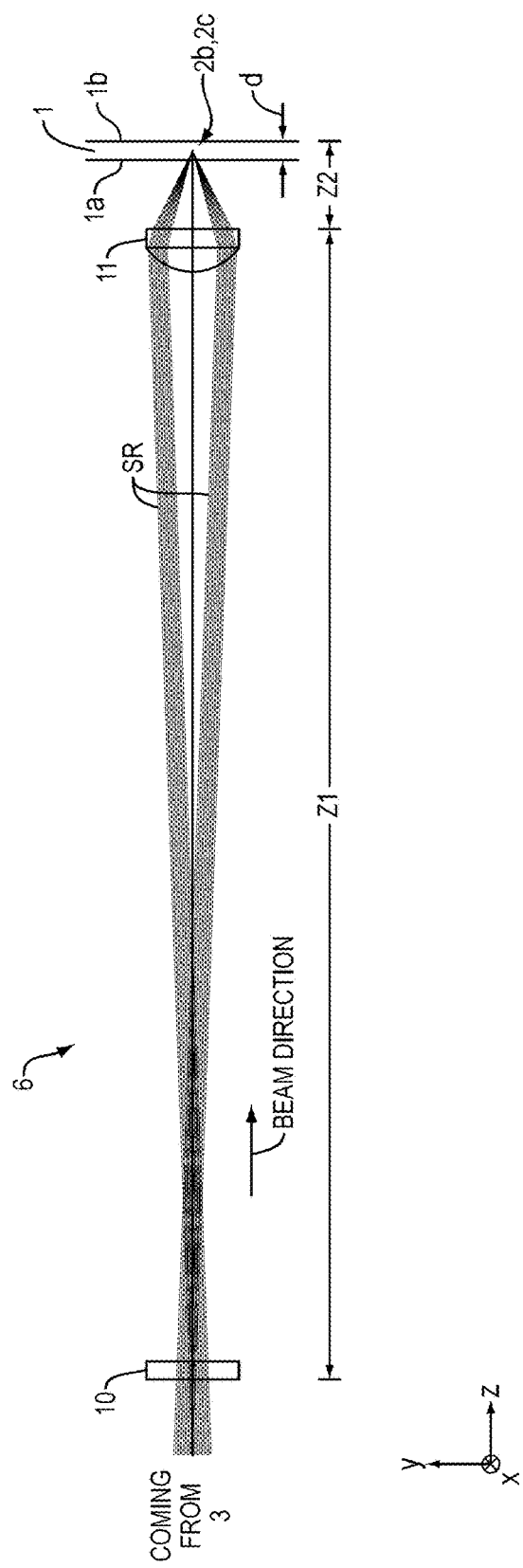
FIGS. 5A and 5B are illustrations of a third optical assembly for laser drilling.

For this reason, it may be desirable to use an optical assembly 6 that includes both an axicon and a focusing lens. FIG. 5A depicts such an optical assembly 6 in which a first optical element (viewed along the beam direction) with a non-spherical free surface designed to form a laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance Z1, in this case approximately 300 mm, is selected in such a way that the laser radiation formed by axicon 10 is circularly incident on the outer radial portion of lens 11. Lens 11 focuses the circular radiation on the output side at a distance Z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 5B:
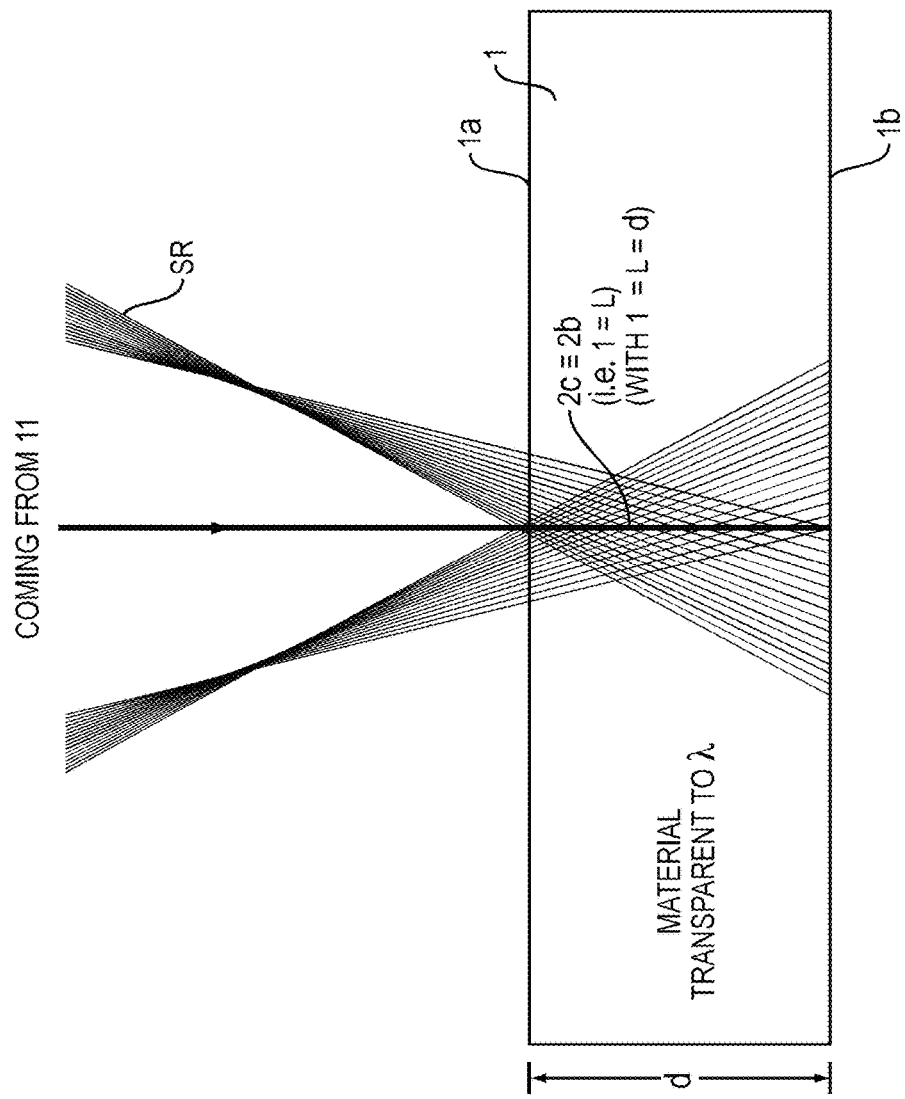

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the length l of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and on the other hand, however, the circle of diffusion diminishes in intensity after the required focal line 2b over a very short distance in the center of the spot, as a basically circular spot is formed. In this way, the formation of defect lines is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance Z1 (axicon-lens separation) and via the cone angle of the axicon. In this way, the entire laser energy can be concentrated in the focal line.

If formation of the defect line is intended to continue to the back side of the substrate, the circular (annular) illumination still has the advantage that (1) the laser power is used optimally in the sense that most of the laser light remains concentrated in the required length of the focal line and (2) it is possible to achieve a uniform spot size along the focal line—and thus a uniform separation of part from substrate along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
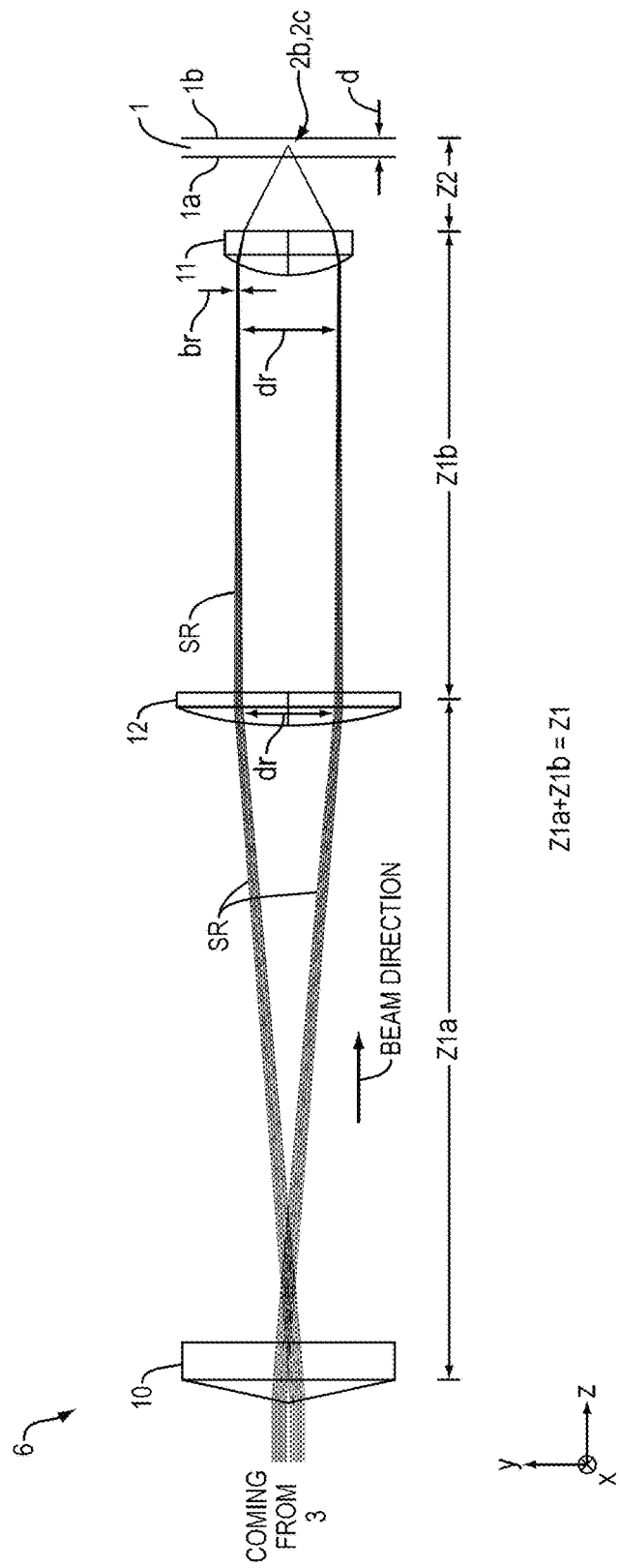
FIG. 6 is a schematic illustration of a fourth optical assembly for laser drilling.

As shown in FIG. 6, both effects can be avoided by including another lens, a collimating lens 12 in the optical assembly 6. The additional positive lens 12 serves to adjust the circular illumination of focusing lens 11 very tightly. The focal length f' of collimating lens 12 is selected in such a way that the desired circle diameter dr results from distance Z1a from the axicon to the collimating lens 12, which is equal to f'. The desired width br of the ring can be adjusted via the distance Z1b (collimating lens 12 to focusing lens 11). As a matter of pure geometry, the small width of the circular illumination leads to a short focal line. A minimum can be achieved at distance f'.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as Z1a, the distance of focusing lens 11 from collimating lens 12 as Z1b, and the distance of the focal line 2b from the focusing lens 11 as Z2 (always viewed in beam direction). As shown in FIG. 6, the circular radiation SR formed by axicon 10, which is incident divergently and under the circle diameter dr on the collimating lens 12, is adjusted to the required circle width br along the distance Z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

FIGS. 7A-7C illustrate the laser-matter interaction at different laser intensity regimes. In the first case, shown in FIG. 7A, the unfocused laser beam 710 goes through a transparent substrate 720 without introducing any modification to it. In this particular case, the nonlinear effect is not present because the laser energy density (or laser energy per units of area illuminated by the beam) is below the threshold necessary to induce nonlinear effects. The higher the energy density, the higher is the intensity of the electromagnetic field. Therefore, as shown in FIG. 7B when the laser beam is focused by spherical lens 730 to a smaller spot size, as shown in FIG. 7B, the illuminated area is reduced and the energy density increases, triggering the nonlinear effect that will modify the material to permit formation of a fault line only in the volume where that condition is satisfied. In this way, if the beam waist of the focused laser is positioned at the surface of the substrate, modification of the surface will occur. In contrast, if the beam waist of the focused laser is positioned below the surface of the substrate, nothing happens at the surface when the energy density is below the threshold of the nonlinear optical effect. But at the focus 740, positioned in the bulk of the substrate 720, the laser intensity is high enough to trigger multi-photon non-linear effects, thus inducing damage to the material. Finally, as shown in FIG. 7C in the case of an axicon, as shown in FIG. 7C, the diffraction pattern of an axicon lens 750, or alternatively a Fresnel axicon, creates interference that generates a Bessel-shaped intensity distribution (cylinder of high intensity 760) and only in that volume is the intensity high enough to create nonlinear absorption and modification to the material 720.

Laser and Optical System

For the purpose of cutting sapphire, a process was developed that uses a 1064 nm picosecond laser in combination with line-focus beam forming optics to create defect lines in the substrate. A sapphire substrate with 0.55 mm thickness was positioned so that it was within the region of the focal line produced by the optics. With a focal line of about 1 mm in length, and a picosecond laser that produces output power of about 24 W or more at a repetition rate of 200 kHz (about 120 µJ/pulse in pulse mode or about 120 µJ/burst in burst mode) measured at the material, the optical intensities in the focal line region can easily be high enough to create nonlinear absorption in the sapphire or sapphire-containing substrate material. A region of damaged, ablated, vaporized, or otherwise modified material within the sapphire substrate was created that approximately followed the linear region of high intensity.

The ultrashort (pulse durations on the order tens of picoseconds or shorter) laser can be operated in pulse mode or burst mode. In pulse mode, a series of nominally identical single pulses is emitted from the laser and directed to the substrate. In pulse mode, the repetition rate of the laser is determined by the spacing in time between the pulses. In burst mode, bursts of pulses are emitted from the laser, where each burst includes two or more pulses (of equal or different amplitude). In burst mode, pulses within a burst are separated by a first time interval (which defines a pulse repetition rate for the burst) and the bursts are separated by a second time interval (which defines a burst repetition rate), where the second time interval is typically much longer than the first time interval. As used herein (whether in the context of pulse mode or burst mode), time interval refers to the time difference between corresponding parts of a pulse or burst (e.g. leading edge-to-leading edge, peak-to-peak, or trailing edge-to-trailing edge). Pulse and burst repetition rates are controlled by the design of the laser and can typically be adjusted, within limits, by adjusting operating conditions of the laser. Typical pulse and burst repetition rates are in the kHz to MHz range. The laser pulse duration (in pulse mode or for pulses within a burst in burst mode) may be $10^{-10}$ s or less, or $10^{-11}$ s or less, or $10^{-12}$ s or less, or $10^{-13}$ s or less. In the exemplary embodiments described herein, the laser pulse duration is greater than $10^{-15}$.

Figure 8A:
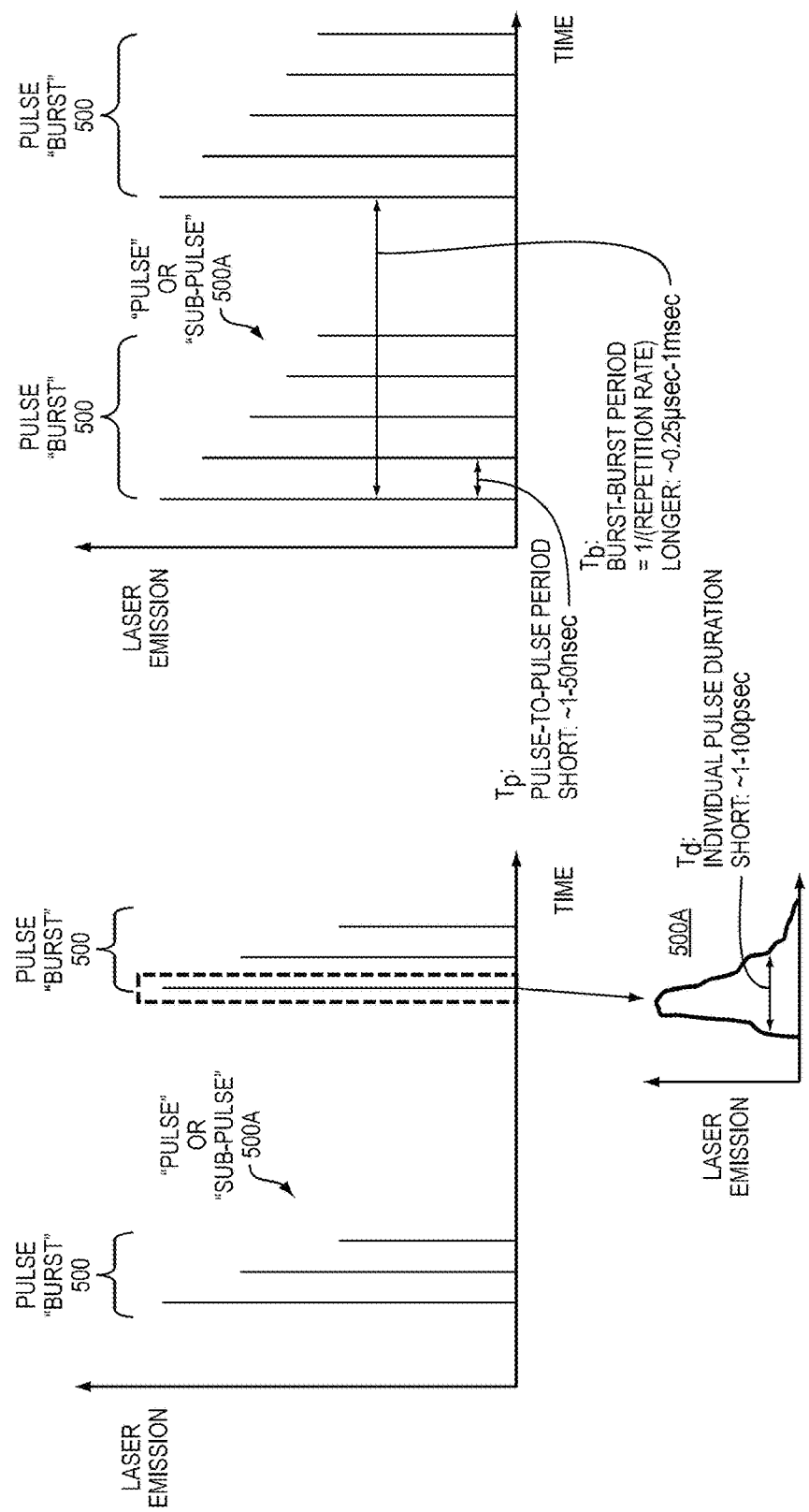
FIG. 8A depicts laser emission as a function of time for a picosecond laser. Each emission is characterized by a pulse "burst" which may contain one or more sub-pulses. Times corresponding to pulse duration, separation between pulses, and separation between bursts are illustrated.

More specifically, as illustrated in FIG. 8A, according to selected embodiments described herein, the picosecond laser creates a "burst" 500 of pulses 500A, sometimes also called a "burst pulse". Bursting is a type of laser operation where the emission of pulses is not in a uniform and steady stream but rather in tight clusters of pulses. Each "burst" 500 may contain multiple pulses 500A (such as 2 pulses, 3 pulses, 4 pulses, 5 pulses, 10, 15, 20, or more) of very short duration $T_d$ up to 100 psec (for example, 0.1 psec, 5 psec, 10 psec, 15 psec, 18 psec, 20 psec, 22 psec, 25 psec, 30 psec, 50 psec, 75 psec, or therebetween). The pulse duration is generally in a range from about 1 psec to about 1000 psec, or in a range from about 1 psec to about 100 psec, or in a range from about 2 psec to about 50 psec, or in a range from about 5 psec to about 20 psec. These individual pulses 500A within a single burst 500 can also be termed "sub-pulses," which simply denotes the fact that they occur within a single burst of pulses. The energy or intensity of each laser pulse 500A within the burst may not be equal to that of other pulses within the burst, and the intensity distribution of the multiple pulses within a burst 500 may follow an exponential decay in time governed by the laser design. Preferably, each pulse 500A within the burst 500 of the exemplary embodiments described herein are separated in time from the subsequent pulse in the burst by a duration $T_p$ from 1 nsec to 50 nsec (e.g. 10-50 nsec, or 10-40 nsec, or 10-30 nsec, with the time often governed by the laser cavity design. For a given laser, the time separation $T_p$ between each pulses (pulse-to-pulse separation) within a burst 500 is relatively uniform (±10%). For example, in some embodiments, each pulse is separated in time from the subsequent pulse by approximately 20 nsec (50 MHz pulse repetition frequency). For example, for a laser that produces pulse-to-pulse separation $T_p$ of about 20 nsec, the pulse-to-pulse separation $T_p$ within a burst is maintained within about ±10%, or is about ±2 nsec. The time between each "burst" (i.e., time separation $T_b$ between bursts) will be much longer (e.g., $0.25 \leq T_b \leq 1000$ microseconds, for example 1-10 microseconds, or 3-8 microseconds,) For example in some of the exemplary embodiments of the laser described herein it is around 5 microseconds for a laser repetition rate or frequency of about 200 kHz. The laser repetition rate is also referred to as burst repetition frequency or burst repetition rate herein, and is defined as the time between the first pulse in a burst to the first pulse in the subsequent burst. In other embodiments, the burst repetition frequency is in a range of between about 1 kHz and about 4 MHz, or in a range between about 1 kHz and about 2 MHz, or in a range of between about 1 kHz and about 650 kHz, or in a range of between about 10 kHz and about 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 kHz burst repetition rate). The exact timings, pulse durations, and repetition rates can vary depending on the laser design and user-controllable operating parameters. Short pulses ($T_d$<20 psec and preferably $T_d$≤15 psec) of high intensity have been shown to work well.

The required energy to modify the material can be described in terms of the burst energy—the energy contained within a burst (each burst 500 contains a series of pulses 500A), or in terms of the energy contained within a single laser pulse (many of which may comprise a burst). For these applications, the energy per burst (per millimeter of the material to be cut) can be from 10-2500 µJ, or from 20-1500 µJ, or from 25-750 µJ, or from 40-2500 µJ, or from 100-1500 µJ, or from 200-1250 µJ, or from 250-1500 µJ, or from 250-750 µJ. The energy of an individual pulse within the burst will be less, and the exact individual laser pulse energy will depend on the number of pulses 500A within the burst 500 and the rate of decay (e.g, exponential decay rate) of the laser pulses with time as shown in FIG. 8A. For example, for a constant energy/burst, if a pulse burst contains 10 individual laser pulses 500A, then each individual laser pulse 500A will contain less energy than if the same burst pulse 500 had only 2 individual laser pulses.

The use of lasers capable of generating such pulse bursts is advantageous for cutting or modifying transparent materials, for example glass. In contrast with the use of single pulses spaced apart in time by the repetition rate of a single-pulsed laser, the use of a burst pulse sequence that spreads the laser energy over a rapid sequence of pulses within burst 500 allows access to larger timescales of high intensity interaction with the material than is possible with single-pulse lasers. While a single-pulse can be expanded in time, conservation of energy dictates that as this is done, the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant and the light-material interaction is no longer strong enough to allow for cutting. In contrast, with a burst pulse laser, the intensity during each pulse or sub-pulse 500A within the burst 500 can remain very high—for example three pulses 500A with pulse duration $T_d$ 10 psec that are spaced apart in time by a separation $T_p$ of approximately 10 nsec still allows the intensity within each pulse to be approximately three times higher than that of a single 10 psec pulse, while the laser is allowed to interact with the material over a timescale that is three orders of magnitude larger. This adjustment of multiple pulses 500A within a burst thus allows manipulation of timescale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of defect lines (perforations). The amount of burst energy required to modify the material will depend on the substrate material composition and the length of the line focus used to interact with the substrate. The longer the interaction region, the more the energy is spread out, and the higher the burst energy that will be required.)

A defect line or a hole is formed in the material when a single burst of pulses strikes essentially the same location on the glass. That is, multiple laser pulses within a single burst can produce a single defect line or a hole location in the glass. Of course, if the glass is translated (for example by a constantly moving stage) or the beam is moved relative to the glass, the individual pulses within the burst cannot be at exactly the same spatial location on the glass. However, they are well within 1µm of one another-i.e., they strike the glass at essentially the same location. For example, they may strike the glass at a spacing sp where 0<sp≤500 nm from one another. For example, when a glass location is hit with a burst of 20 pulses the individual pulses within the burst strike the glass within 250 nm of each other. Thus, in some embodiments 1 nm<sp<250 nm. In in some embodiments 1 nm<sp<100 nm.

Perforation Formation:

If the substrate has sufficient stress (e.g. with ion exchanged glass), then the part will spontaneously separate from the substrate along the fault line traced out by the laser process. However, if there is not a lot of stress inherent to the substrate, then the picosecond laser will simply form defect lines in the substrate. These defect lines generally take the form of holes with interior dimensions (diameters) in a range of about 0.5-1.5 µm.

Figure 8B:
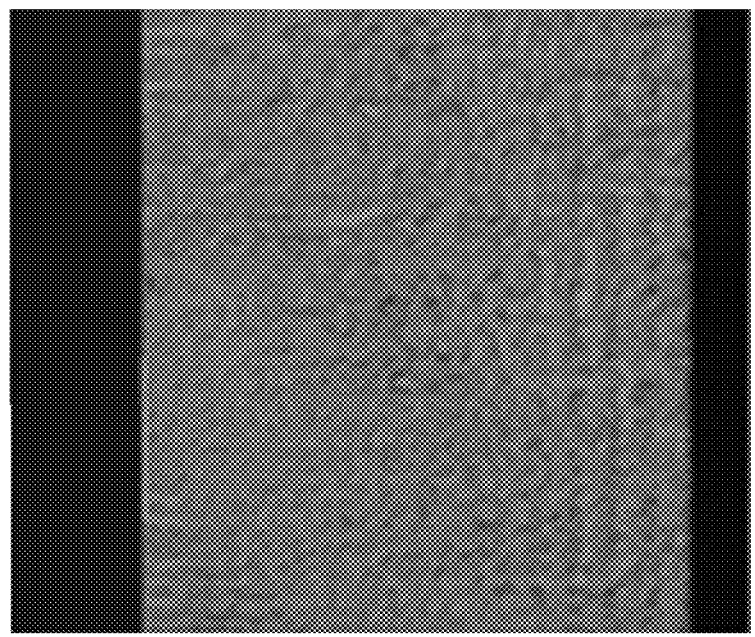
FIG. 8B is a photograph showing an edge image of a straight cut strip of 0.55 mm thick sapphire substrate.

The holes or defect lines may or may not perforate the entire thickness of the material, and may or may not be a continuous opening throughout the depth of the material. FIG. 8B shows an example of defect lines extending the entire thickness of a piece of 550 µm thick sapphire substrate. The defect lines are observed through the side of a cleaved edge. The defect lines through the material are not necessarily through holes—there may be regions of material that plug the holes, but they are generally small in size, on the order of microns. Note that upon separation of the part, fracture occurs along the defect lines to provide a part having a perimeter surface (edge) with features derived from the defect lines. Before separation, the defect lines are generally cylindrical in shape. Upon separation of the part, the defect lines fracture and remnants of the defect lines are evident in the contours of the perimeter surface of the separated part. In an ideal model, the defect lines are cleaved in half upon separation so that the perimeter surface of the separated part includes serrations corresponding to half-cylinders. In practice, separation may deviate from an ideal model and the serrations of the perimeter surface may be an arbitrary fraction of the shape of the original defect line. Irrespective of the particular form, features of the perimeter surface will be referred to as defect lines to indicate the origin of their existence.

Figure 9:
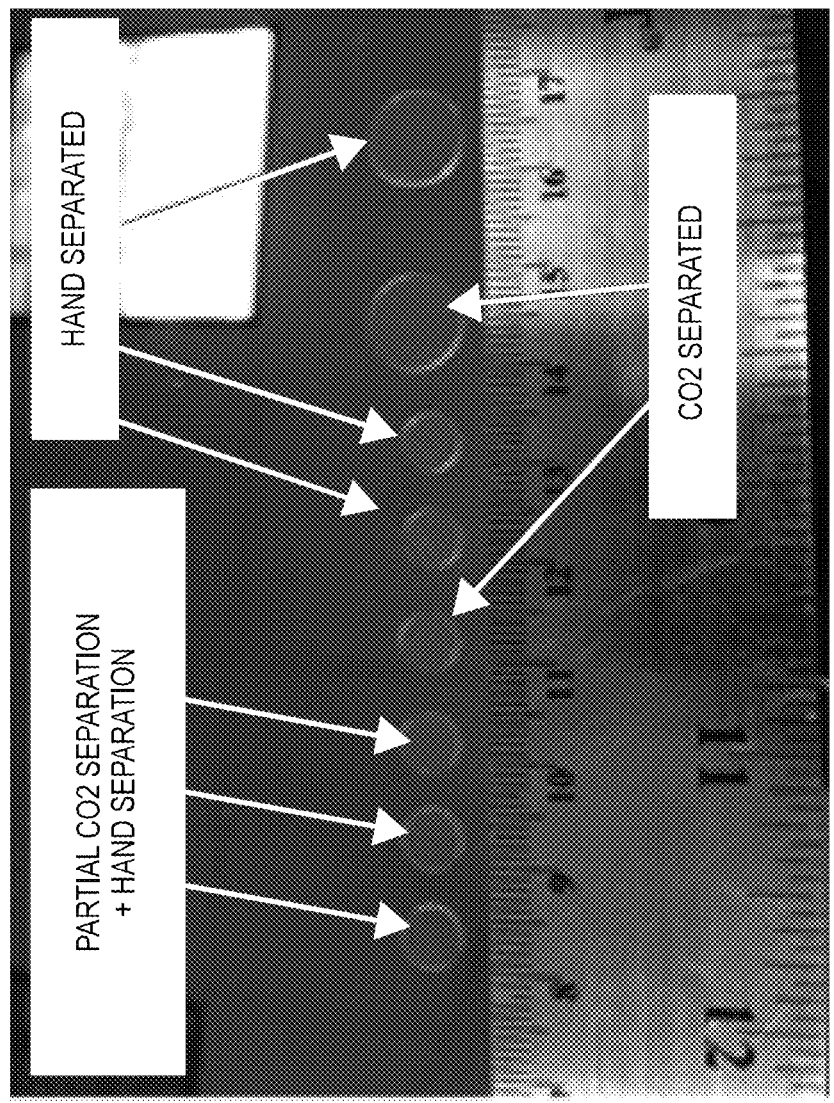
FIG. 9 is a photograph showing sapphire buttons separated from a 0.55 mm thick sample. Some buttons were manually separated, others partially separated with the aid of a $CO_2$ laser and some were fully separated with the $CO_2$ laser.

FIG. 9 shows examples of small circular disks cut out of the same substrate with diameters of 6 mm and 10 mm. Some of the disks were mechanically separated, some were separated using a $CO_2$ laser and some were separated by the $CO_2$ laser and mechanically released from the substrate.

As described above, it is also possible to perforate stacked sheets of materials. In this case, the focal line length needs to be longer than the stack height.

The lateral spacing (pitch) between the holes (perforations, defect lines) is determined by the pulse rate of the laser as the substrate is translated underneath the focused laser beam. Only a single picosecond laser pulse or burst is usually necessary to form an entire hole, but multiple pulses or bursts may be used if desired. To form holes at different pitches, the laser can be triggered to fire at longer or shorter intervals. For cutting operations, the laser triggering generally is synchronized with the stage driven motion of the substrate beneath the beam, so laser pulses are triggered at a fixed interval, such as every 1 μm, or every 5 μm. The exact spacing between adjacent perforations is determined by the material properties that facilitate crack propagation from perforated hole to perforated hole, given the stress level in the substrate. However, in contrast to cutting a substrate, it is also possible to use the same method to only perforate the material. In the methods described herein, the holes may be separated by larger spacings (e.g. 7 μm pitch or greater).

The laser power and lens focal length (which determines the focal line length and hence power density) are particularly important parameters to ensure full penetration of the substrate and low surface and sub-surface damage.

In general, the higher the available laser power, the faster the material can be cut with the above process. The process(es) disclosed herein can cut glass at a cutting speed of 0.25 m/sec, or faster. A cut speed (or cutting speed) is the rate the laser beam moves relative to the surface of the substrate material (e.g., glass) while creating multiple defect lines holes. High cut speeds, such as, for example 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut glass materials at high cutting speeds, the defect lines are typically spaced apart by 1-25 μm, in some embodiments the spacing is preferably 3 μm or larger—for example 3-12 μm, or for example 5-10 μm.

For example, to achieve a linear cutting speed of 300 mm/sec, 3 μm hole pitch corresponds to a pulse burst laser with at least 100 kHz burst repetition rate. For a 600 mm/sec cutting speed, a 3 μm pitch corresponds to a burst-pulsed laser with at least 200 kHz burst repetition rate. A pulse burst laser that produces at least 40 μJ/burst at 200 kHz, and cuts at a 600 mm/s cutting speed needs to have a laser power of at least 8 Watts. Higher cut speeds require accordingly higher laser powers.

For example, a 0.4 m/sec cut speed at 3 μm pitch and 40 μJ/burst would require at least a 5 W laser, a 0.5 m/sec cut speed at 3 μm pitch and 40 μJ/burst would require at least a 6 W laser. Thus, preferably the laser power of the pulse burst ps laser is 6 W or higher, more preferably at least 8 W or higher, and even more preferably at least 10 W or higher. For example, in order to achieve a 0.4 m/sec cut speed at 4 μm pitch (defect line spacing, or damage tracks spacing) and 100 μJ/burst, one would require at least a 10 W laser, and to achieve a 0.5 m/sec cut speed at 4 μm pitch and 100 μJ/burst, one would require at least a 12 W laser. For example, a to achieve a cut speed of 1 m/sec at 3 μm pitch and 40 μJ/burst, one would require at least a 13 W laser. Also, for example, 1 m/sec cut speed at 4 μm pitch and 400 μJ/burst would require at least a 100 W laser.

The optimal pitch between defect lines (damage tracks) and the exact burst energy is material dependent and can be determined empirically. However, it should be noted that raising the laser pulse energy or making the damage tracks at a closer pitch are not conditions that always make the substrate material separate better or with improved edge quality. A pitch that is too small (for example <0.1 micron, or in some exemplary embodiments <1 μm, or in other embodiments <2 μm) between defect lines (damage tracks) can sometimes inhibit the formation of nearby subsequent defect lines (damage tracks), and often can inhibit the separation of the material around the perforated contour. An increase in unwanted micro cracking within the glass may also result if the pitch is too small. A pitch that is too long (e.g. >50 μm, and in some glasses >25 μm or even >20 μm) may result in "uncontrolled microcracking"—i.e., where instead of propagating from defect line to defect line along the intended contour, the microcracks propagate along a different path, and cause the glass to crack in a different (undesirable) direction away from the intended contour. This may ultimately lower the strength of the separated part since the residual microcracks constitute flaws that weaken the glass. A burst energy for forming defect lines that is too high (e.g., >2500 μJ/burst, and in some embodiments >500 μJ/burst) can cause "healing" or re-melting of previously formed defect lines, which may inhibit separation of the glass. Accordingly, it is preferred that the burst energy be <2500 μJ/burst, for example, ≤500 μJ/burst. Also, using a burst energy that is too high can cause formation of microcracks that are extremely large and create structural imperfections that can reduce the edge strength of the part after separation. A burst energy that is too low (e.g. <40 μJ/burst) may result in no appreciable formation of defect lines within the glass, and hence may necessitate especially high separation force or result in a complete inability to separate along the perforated contour.

Typical exemplary cutting rates (speeds) enabled by this process are, for example, 0.25 m/sec and higher. In some embodiments, the cutting rates are at least 300 mm/sec. In some embodiments, the cutting rates are at least 400 mm/sec, for example, 500 mm/sec to 2000 mm/sec, or higher. In some embodiments the picosecond (ps) laser utilizes pulse bursts to produce defect lines with periodicity between 0.5 μm and 13 μm, e.g. between 0.5 and 3 μm. In some embodiments, the pulsed laser has laser power of 10 W-100 W and the material and/or the laser beam are translated relative to one another at a rate of at least 0.25 m/sec; for example, at the rate of 0.25 m/sec to 0.35 m/sec, or 0.4 m/sec to 5 m/sec. Preferably, each pulse burst of the pulsed laser beam has an average laser energy measured at the workpiece greater than 40 μJ per burst per mm thickness of workpiece. Preferably, each pulse burst of the pulsed laser beam has an average laser energy measured at the workpiece greater of less than 2500 μJ per burst per mm thickness of workpiece, and preferably lass than about 2000 μJ per burst per mm thickness of workpiece, and in some embodiments less than 1500 μJ per burst per mm thickness of workpiece; for example, not more than 500 μJ per burst per mm thickness of workpiece.

We discovered that much higher (5 to 10 times higher) volumetric pulse energy density ($\mu J/\mu m^3$) is required for perforating alkaline earth boroaluminosilicate glasses with low or no alkali content. This can be achieved, for example, by utilizing pulse burst lasers, preferably with at least 2 pulses per burst and providing volumetric energy densities within the alkaline earth boroaluminosilicate glasses (with low or no alkali) of about 0.05 $\mu J/\mu m^3$ or higher, e.g., at least 0.1 $\mu J/\mu m^3$, for example 0.1-0.5 $\mu J/\mu m^3$.

Accordingly, it is preferable that the laser produces pulse bursts with at least 2 pulses per burst. For example, in some embodiments the pulsed laser has a power of 10 W-150 W (e.g., 10 W-100 W) and produces pulse bursts with at least 2 pulses per burst (e.g., 2-25 pulses per burst). In some embodiments the pulsed laser has a power of 25 W-60 W, and produces pulse bursts with at least 2-25 pulses per burst, and periodicity or distance between the adjacent defect lines produced by the laser bursts is 2-10 µm. In some embodiments, the pulsed laser has a power of 10 W-100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec.

For example, for cutting 0.7 mm thick non-ion exchanged Corning code 2319 or code 2320 Gorilla® glass, it is observed that pitches of 3-7 µm can work well, with pulse burst energies of about 150-250 µJ/burst, and burst pulse numbers that range from 2-15, and preferably with pitches of 3-5 µm and burst pulse numbers (number of pulses per burst) of 2-5.

At 1 m/sec cut speeds, the cutting of Eagle XG® glass typically requires utilization of laser powers of 15-84 W, with 30-45 W often being sufficient. In general, across a variety of glass and other transparent materials, applicants discovered that laser powers between 10 W and 100 W are preferred to achieve cutting speeds from 0.2-1 m/sec, with laser powers of 25-60 W being sufficient (or optimum) for many glasses. For cutting speeds of 0.4 m/sec to 5 m/sec, laser powers should preferably be 10 W-150 W, with burst energy of 40-750 µJ/burst, 2-25 bursts per pulse (depending on the material that is cut), and defect line separation (pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10 W-100 W of power, for example 25 W to 60 W, and produces pulse bursts at least 2-25 pulses per burst and the distance between the defect lines is 2-15 µm; and the laser beam and/or workpiece are translated relative to one another at a rate of at least 0.25 m/sec, in some embodiments at least 0.4 m/sec, for example 0.5 m/sec to 5 m/sec, or faster.

Cutting and Separating Shapes of a Plate

As shown in FIG. 9, different conditions were found that allow the separation of sapphire parts from a sapphire substrate. The first method is to use only the picosecond laser to create through holes and forming a fault line following the desired shape (in this case circles with diameters of 6 and 10 mm). After this step, mechanical separation can be accomplished by using a breaking plier, manually bending the part, or any method that creates tension that initiates and propagates the separation along the fault line. To create through holes in 550 µm thick sapphire and mechanically separate the disks from the plate, good results were found for the following optics and laser parameters:

Input beam diameter to axicon lens ~2 mm
Axicon angle=10 degrees
Initial collimating lens focal length=125 mm
Final objective lens focal length=30 mm
Incident beam convergence angle (Beta)=12.75 degrees
Focus set to be at Z=0.75 mm (approximately 200 µm above the top surface of the part)
Laser power ~24 Watts (60% of full power)
Burst repetition rate of the laser=200 kHz.
Energy per burst=120 µJ (24 W/200 kHz)
4 pulses/burst
Single pass The second method is to use a defocused $CO_2$ laser that follows the picosecond laser, after it has finished tracing the desired contour, to fully separate the part from the surrounding substrate matrix. The thermal stress induced by the defocused $CO_2$ laser is enough to initiate and propagate the separation following the desired contour, releasing it from the panel. For this case, good results were found for the following optics and laser parameters:

Picosecond laser:
Input beam diameter to axicon lens ~2 mm
Axicon angle=10 degrees
Initial collimating lens focal length=125 mm
Final objective lens focal length=30 mm
incident beam convergence angle (Beta)=12.75 degrees
Focus set to be at Z=0.75 mm (approximately 200 µm above the top surface of the part)
Laser power ~24 Watts (60% of full power)
Burst repetition rate of the laser=200 kHz.
Energy per burst=120 µJ (24 W/200 kHz)4 pulses/burst
Single pass for 10 mm diameter and double pass for 6 mm diameter
$CO_2$ laser:
Laser translation speed: 250 mm/s
Laser power=200 W
Pulse duration 45 µs (95% duty cycle)
Laser modulation frequency 20 kHz
Laser beam defocus (relative to the incident surface of the glass) is 20 mm
Single pass for 10 mm diameter and double pass for 6 mm diameter Finally the last condition explored is a mix of the two methods described above, where a defocused $CO_2$ laser follows the picosecond laser after it has finished tracing the desired contour to partially separate the part from the surrounding substrate matrix. The thermal stress induced by the $CO_2$ laser is enough to initiate and partially propagate the separation along the desired contour, but not enough to release it from the surrounding substrate matrix. Sometimes, process convenience or efficiency makes it desirable to delay the release of the part until a later step. For this case, the best results were found for the same picosecond laser conditions described above and either a lower $CO_2$ laser power or higher defocus (greater than about 25 mm) of the $CO_2$ laser beam and higher translation speed, depending on the degree of separation being pursued.

Figure 10A:
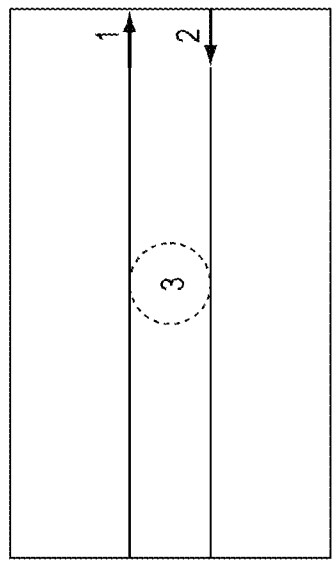
FIGS. 10A and 10B are illustrations of a fault line perforation sequence, including circle and release lines, created with a picosecond laser (FIG. 10A), and subsequent $CO_2$ laser tracing (FIG. 10B) to release the button out of the original plate.
Figure 10B:
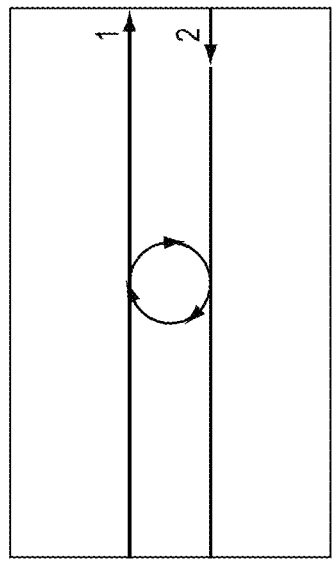

FIGS. 10A and 10B, respectively, show exemplary perforations that were traced by the picosecond laser, and exposed to the $CO_2$ laser to release the buttons. The $CO_2$ laser may be a defocused $CO_2$ laser and may be traversed from a distal (or proximal) edge of the substrate to a proximal (or distal) edge of the substrate. It is important to notice that the introduction of release lines and the path traced by the defocused $CO_2$ laser is carefully planned to avoid issues, such as:

Avoid coincident start/stop position. In general, the slow acceleration/deceleration of the moving stages can be enough to create a punctual stress source that will later crack or even shatter the part.

Stopping or "parking" the defocused $CO_2$ laser on any spot over the traced contour—most commonly this will melt the sapphire surface and/or create micro-cracks. The path of the $CO_2$ laser should be planned to start and finish outside the contour to be released.

Release lines should be planned to allow separation without premature collapse of the surrounding and supporting substrate matrix.

The cutting processes described above provides the following benefits that may translate to enhanced laser processing capabilities and cost savings and thus lower cost manufacturing. In the current embodiment, the cutting process offers:

Full separation of parts being cut with reduced laser power: sapphire can be completely separated or cut in a clean and controlled fashion.

Reduced subsurface damage: due to the ultra-short pulse interaction between laser and material, there is little thermal interaction and thus a minimal heat affected zone that can result in undesirable stress and micro-cracking at the surface and in the subsurface region. In addition, the optics that condense the laser beam into the sapphire or other substrate material create defect lines that are typically 2 to 5 microns in diameter on the surface of the part. After separation, subsurface damage is limited to distances from the perimeter surface less than about 75 µm. This has great impact on the edge strength of the part, as strength is governed by the number of defects, and their statistical distribution in terms of size and depth. The higher these numbers are, the weaker the edges of the part will be.

Process cleanliness: The methods described herein permit separation and/or cutting of sapphire in a clean and controlled fashion. It is very challenging to use conventional ablative or thermal laser processes because they tend to trigger heat affected zones that induce micro-cracks and fragmentation of the substrate into several smaller pieces. The characteristics of the laser pulses and the induced interactions with the material of the disclosed method avoid all of these issues because they occur in a very short time scale and the transparency of the substrate material to the laser radiation minimizes induced thermal effects. Since the defect line is created within the substrate, the presence of debris and particulate matter during the cutting step is virtually eliminated. If there are any particulates resulting from the created defect line, they are well contained until the part is separated.

Cutting Complex Profiles and Shapes in Different Sizes

The present laser processing method allows for cutting/separation of glass, sapphire, and other substrates following many forms and shapes, which is a limitation in other competing technologies. Tight radii may be cut (less than about 5 mm) with the present method, allowing curved edges. Circles of diameters of 5 mm and 10 mm have been successfully cut out of larger sapphire substrates, which is challenging or impossible for other laser techniques. Also, since the defect lines strongly control the location of any crack propagation, this method gives great control to the spatial location of a cut, and allows for cutting and separation of structures and features as small as a few hundred microns.

Elimination of Process Steps

The process to fabricate parts (e.g. glass plates or arbitrarily shaped sapphire parts) from the incoming substrate (e.g. glass panel or sapphire piece) to the final size and shape involves several steps that encompass cutting the substrate, cutting to size, finishing and edge shaping, thinning the parts down to their target thickness, polishing, and even chemically strengthening in some cases. Elimination of any of these steps will improve manufacturing cost in terms of process time and capital expense. The presented method may reduce the number of steps by, for example:

reduced debris and edge defects generation—potential elimination of washing and drying stations;

cutting the sample directly to its final size, shape and thickness—eliminating the need for finishing lines.

Cutting Stacks

The process is also capable of creating these lines with vertical defects on stacked glass panels. There is a limitation to the height of the stack, but it is possible to increase productivity by simultaneously processing multiple stacked plates. It requires that the material be transparent to the laser wavelength, which is the case for sapphire at the laser wavelength used here (1064 nm).

The relevant teachings of all patents, published applications and references cited herein are incorporated by reference in their entirety.

While exemplary embodiments have been described herein, it will be understood by those skilled in the art that various changes in form and details may be made therein without departing from the scope encompassed by the appended claims.

What is claimed is:

1. A method of laser cutting a material comprising:

focusing a pulsed laser beam into a laser beam focal line, the laser beam focal line having a length in a range between about 0.1 mm and 100 mm;

directing the laser beam focal line into the material, the laser beam focal line generating an induced absorption within the material, the induced absorption producing a defect line along the laser beam focal line within the material;

translating the material or the laser beam relative to one another, thereby forming a plurality of defect lines in the material with the laser; and directing an IR laser beam over the plurality of defect lines.

2. The method of claim 1, wherein the material is sapphire.

3. The method of claim 1, wherein a pulse duration of the pulsed laser beam is in a range of between greater than about 1 picosecond and less than about 100 picoseconds.

4. The method of claim 3, wherein the pulse duration of the pulsed laser beam is in a range of between greater than about 5 picoseconds and less than about 20 picoseconds.

5. The method of claim 1, wherein a repetition rate of the pulsed laser beam is in a range of between 1 kHz and 2 MHz.

6. The method of claim 5, wherein the repetition rate of the pulsed laser beam is in a range of between 10 kHz and 650 kHz.

7. The method of claim 1, wherein the pulsed laser beam has an average laser power measured at the material greater than 40µJ per mm thickness of material.

8. The method of claim 1, wherein the pulses are produced in bursts of at least two pulses separated by a duration in a range of between 1 nsec and 50 nsec, and the burst repetition frequency is in a range of between about 1 kHz and about 2000 kHz.

9. The method of claim 8, wherein the pulses are separated by a duration in a range of between 10 nsec and 30 nsec.

10. The method of claim 1, wherein the pulsed laser beam has a wavelength and the material is substantially transparent at the wavelength.

11. The method of claim 1, wherein the laser beam focal line has a length in a range of between about 0.1 mm and about 10 mm.

12. The method of claim 1, wherein the laser beam focal line has an average spot diameter in a range of between about 0.1 µm and about 5 µm.

13. The method of claim 1, further comprising directing the IR laser from a proximal edge of the material to a tangential edge of the part, thereby separating a part from the material.

14. The method of claim 1, wherein directing the IR laser beam comprises directing a $CO_2$ laser beam.

15. The method of claim 1, wherein the IR laser beam is defocused to a spot size in a range of between about 2 mm and about 20 mm.

16. The method of claim 1, wherein directing the IR laser beam includes directing the IR laser beam from a distal edge of the material to a proximal edge of the material.

17. A method of laser cutting a material comprising:
(i) focusing a pulsed laser beam into a laser beam focal line, the laser beam focal line having a length in a range between about 0.1 mm and 100 mm;
ii) directing the laser beam focal line into the material, the laser beam focal line generating an induced absorption within the material, the induced absorption producing a defect line along the laser beam focal line within the material;
(iii) repeatedly performing (i) and (ii) to form a fault line within the material, the fault line including a plurality of the defect lines; and
(iv) directing an IR laser beam over the fault line.

18. The method of claim 17, wherein the fault line is curved.

19. The method of claim 17, wherein the fault line is circular.

20. The method of claim 17, wherein the fault line is linear.

21. The method of claim 17, wherein the directing the IR laser beam fractures the material along the fault line.

22. The method of claim 1, wherein the pulsed laser beam is non-diffractive.

23. The method of claim 22, wherein the pulsed laser beam is a Bessel beam, an Airy beam, a Weber beams or a Mathieu beam.

24. The method of claim 1, wherein the pulsed laser beam is donut-shaped.

25. The method of claim 1, wherein the focusing a pulsed laser beam comprises passing the pulsed laser beam through an axicon.

26. The method of claim 17, wherein the pulsed laser beam is non-diffractive.

27. The method of claim 26, wherein the pulsed laser beam is a Bessel beam, an Airy beam, a Weber beams or a Mathieu beam.

28. The method of claim 17, wherein the pulsed laser beam is donut-shaped.

29. The method of claim 17, wherein the focusing a pulsed laser beam comprises passing the pulsed laser beam through an axicon.

* * * * *

UNITED STATES PATENT AND TRADEMARK OFFICE
CERTIFICATE OF CORRECTION

PATENT NO. : 10,179,748 B2
APPLICATION NO. : 15/585305
DATED : January 15, 2019
INVENTOR(S) : Sasha Marjanovic et al.

It is certified that error appears in the above-identified patent and that said Letters Patent is hereby corrected as shown below:

On the Title Page

On page 2, Column 1, item (56), U.S. Patent Documents, Line 19, delete "5,108,657" and insert -- 5,108,857 --, therefor.

On page 2, Column 2, item (56), U.S. Patent Documents, Line 17, delete "6,535,850" and insert -- 6,635,850 --, therefor.

On page 2, Column 2, item (56), U.S. Patent Documents, Line 43, delete "8,327,566" and insert -- 8,327,666 --, therefor.

On page 3, Column 1, item (56), U.S. Patent Documents, Line 40, delete "2010/0279057" and insert -- 2010/0279067 --, therefor.

On page 3, Column 2, item (56), U.S. Patent Documents, Line 57, delete "Heckert et al." and insert -- Hackert et al. --, therefor.

On page 3, Column 2, item (56), U.S. Patent Documents, Line 70, delete "Bovalsek et al." and insert -- Bovatsek et al. --, therefor.

On page 3, Column 2, item (56), U.S. Patent Documents, Line 72, delete "Niaber et al." and insert -- Nieber et al. --, therefor.

On page 4, Column 1, item (56), Foreign Patent Documents, Line 44, delete "9105243" and insert -- 9106243 --, therefor.

On page 5, Column 1, item (56), other publications, Line 15, delete "Desion" and insert -- Design --, therefor.

On page 5, Column 1, item (56), other publications, Line 24, delete "ScionceDirect" and insert Signed and Sealed this
Twenty-second Day of October, 2019

Andrei Iancu
*Director of the United States Patent and Trademark Office*

CERTIFICATE OF CORRECTION (continued)
U.S. Pat. No. 10,179,748 B2

-- ScienceDirect --, therefor.

On page 5, Column 1, item (56), other publications, Line 39, delete "651-554;" and insert -- 651-654; --, therefor.

On page 5, Column 1, item (56), other publications, Line 43, delete "Jun. 15, 2005;" and insert -- Jun. 13, 2005; --, therefor.

On page 5, Column 2, item (56), other publications, Line 55, delete "24588-24698;" and insert -- 24688-24698; --, therefor.

On page 5, Column 2, item (56), other publications, Line 65, delete "Re & RMS:" and insert -- Ra & RMS: --, therefor.

On page 5, Column 2, item (56), other publications, Lines 65-66, delete "Eelectropolishing;" and insert -- Electropolishing; --, therefor.

On page 6, Column 2, item (56), other publications, Line 114, delete "S883-5886;" and insert -- S883-S886; --, therefor.

On page 6, Column 2, item (56), other publications, Line 15, delete "Springer-Verlag Physics." and insert -- Springer-Verlag. --, therefor.

On page 6, Column 2, item (56), other publications, Line 17, delete "i-30." and insert -- 1-30. --, therefor.

On page 6, Column 2, item (56), other publications, Line 42, delete "Ferntosecond" and insert -- Femtosecond --, therefor.

On page 6, Column 2, item (56), other publications, Line 43, delete "157-152;" and insert -- 157-162; --, therefor.

In the Claims

In Column 24, Line 44, Claim 7, delete "40μJ" and insert -- 40 μJ --, therefor.

In Column 25, Line 11, Claim 17, delete "ii)" and insert -- (ii) --, therefor.